United States Patent
Ezaki

(10) Patent No.: US 10,781,746 B2
(45) Date of Patent: Sep. 22, 2020

(54) VARIABLE COMPRESSION RATIO MECHANISM

(71) Applicant: TOYOTA JIDOSHA KABUSHIKI KAISHA, Toyota-shi, Aichi-ken (JP)

(72) Inventor: Shuichi Ezaki, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 211 days.

(21) Appl. No.: 15/922,245

(22) Filed: Mar. 15, 2018

(65) Prior Publication Data
US 2018/0266314 A1   Sep. 20, 2018

(30) Foreign Application Priority Data

Mar. 16, 2017   (JP) .................. 2017-051722

(51) Int. Cl.
| | |
|---|---|
| F02B 75/04 | (2006.01) |
| F02D 15/02 | (2006.01) |
| F16C 7/06 | (2006.01) |
| F16C 23/10 | (2006.01) |

(52) U.S. Cl.
CPC .......... *F02B 75/045* (2013.01); *F02D 15/02* (2013.01); *F16C 7/06* (2013.01); *F16C 23/10* (2013.01); *F02B 75/048* (2013.01); *F16C 2360/22* (2013.01)

(58) Field of Classification Search
CPC .......... F02B 75/045; F02D 15/02; F16C 7/06
USPC ........................................ 123/48 B
See application file for complete search history.

(56) References Cited

U.S. PATENT DOCUMENTS

| | | |
|---|---|---|
| 2015/0260094 A1 | 9/2015 | Wittek |
| 2015/0260109 A1 | 9/2015 | Wittek |

FOREIGN PATENT DOCUMENTS

| | | |
|---|---|---|
| WO | WO 2014/019683 | 2/2014 |
| WO | WO2014/019684 A1 | 2/2014 |
| WO | WO 2016/037696 | 3/2016 |
| WO | WO 2016/037696 A1 * | 3/2016 |

* cited by examiner

*Primary Examiner* — Lindsay M Low
*Assistant Examiner* — Omar Morales
(74) *Attorney, Agent, or Firm* — Finnegan, Henderson, Farabow, Garrett & Dunner, LLP

(57) ABSTRACT

A variable compression ratio mechanism includes a variable length connecting rod. The variable length connecting rod includes a connecting rod body, an eccentric member, and an eccentric member drive mechanism. The eccentric member includes a piston pin receiving opening, is rotatably attached to the body, and changes in effective length when it is rotated. The eccentric member drive mechanism includes a projecting pin protruding from the body and rotating the eccentric member when a position of the projecting pin relative to the body changes. A guide member of the variable compression ratio mechanism guides the projecting pin during operation.

10 Claims, 13 Drawing Sheets

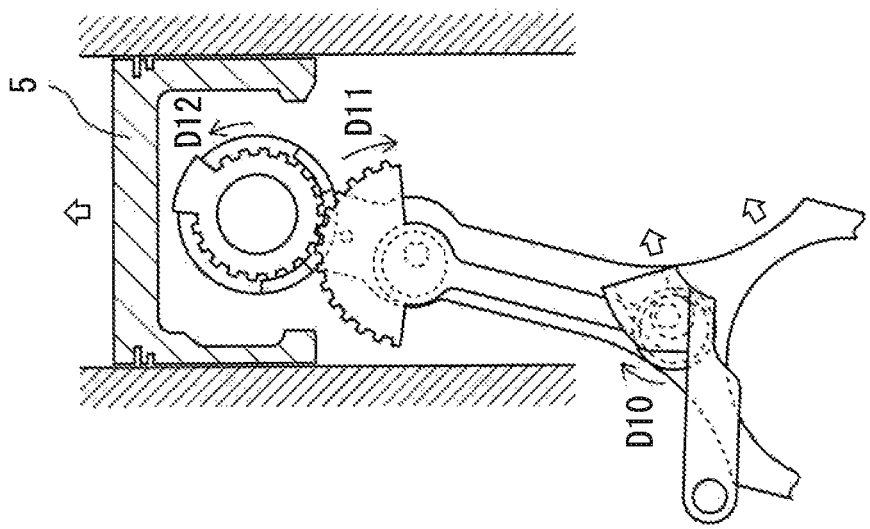
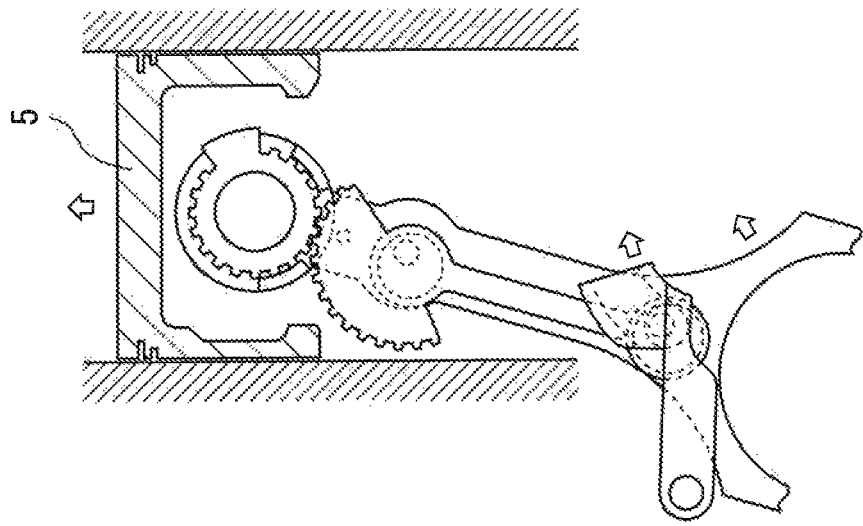
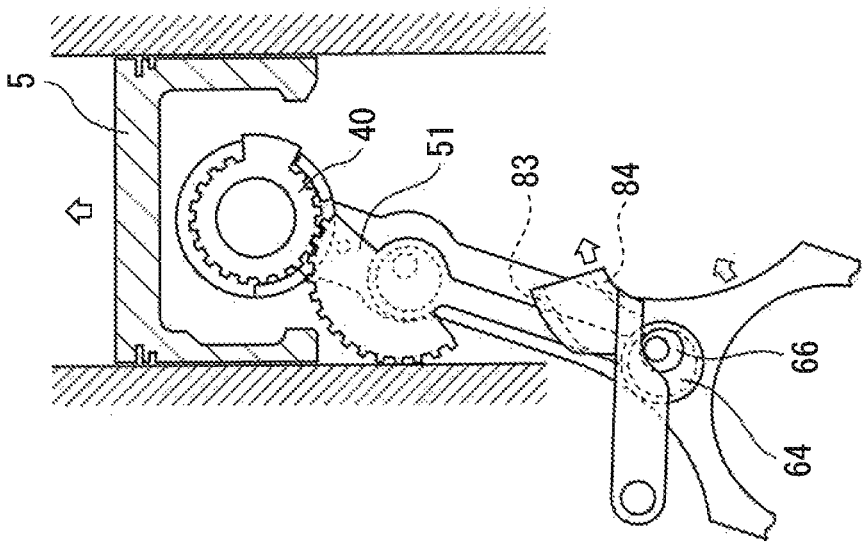

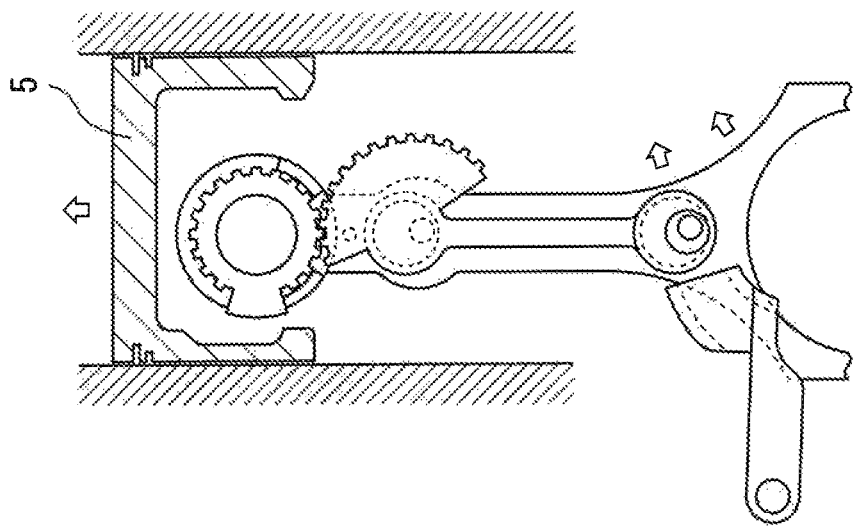
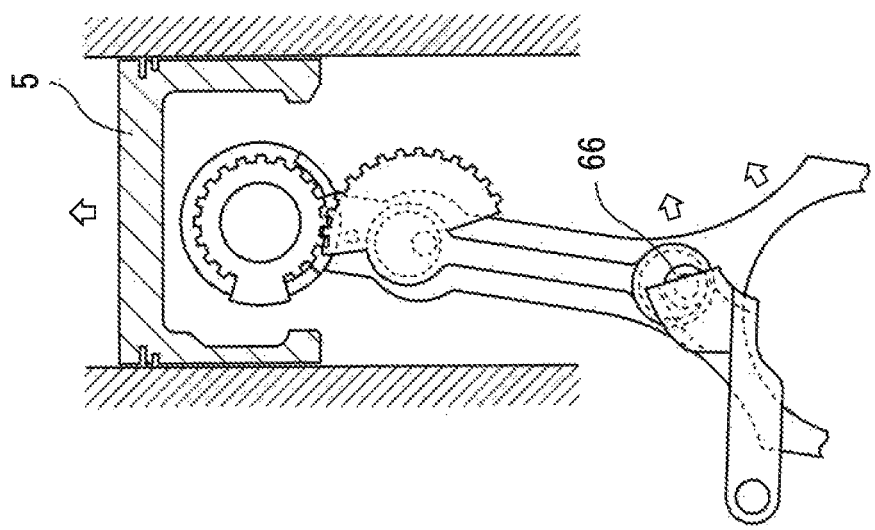
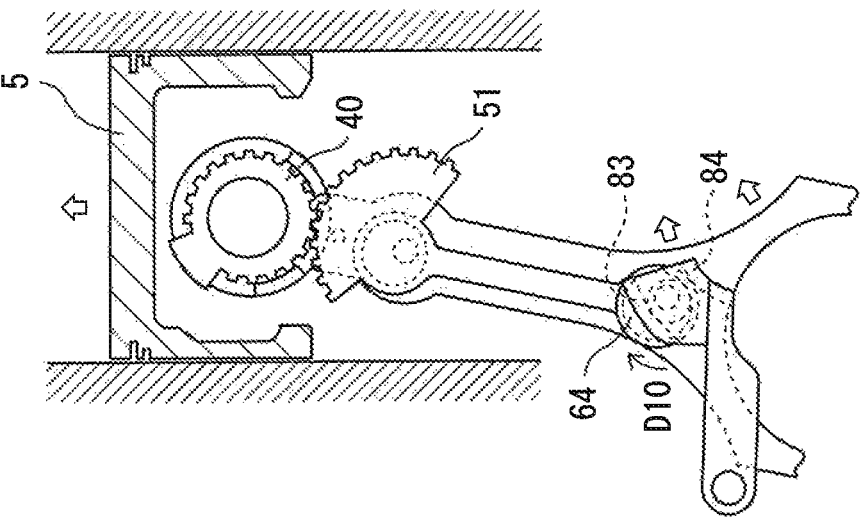

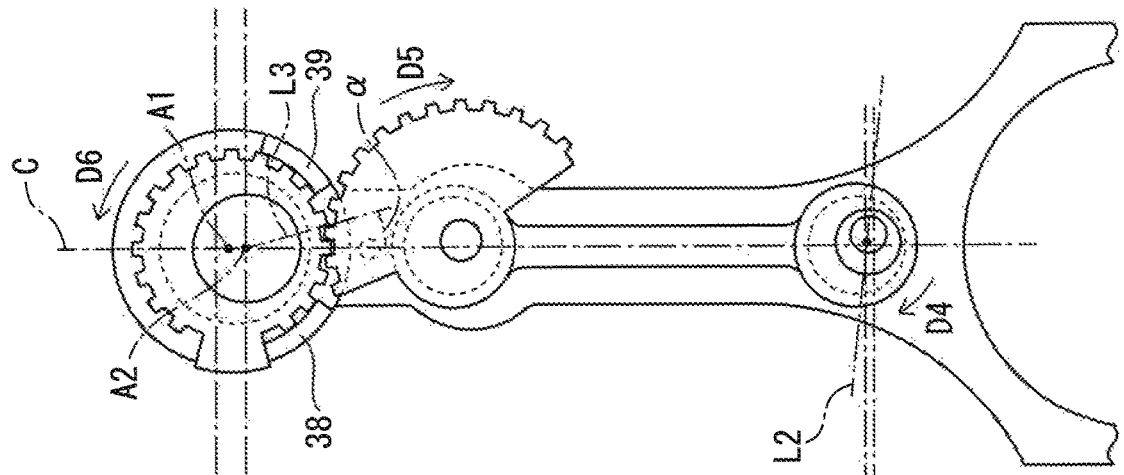
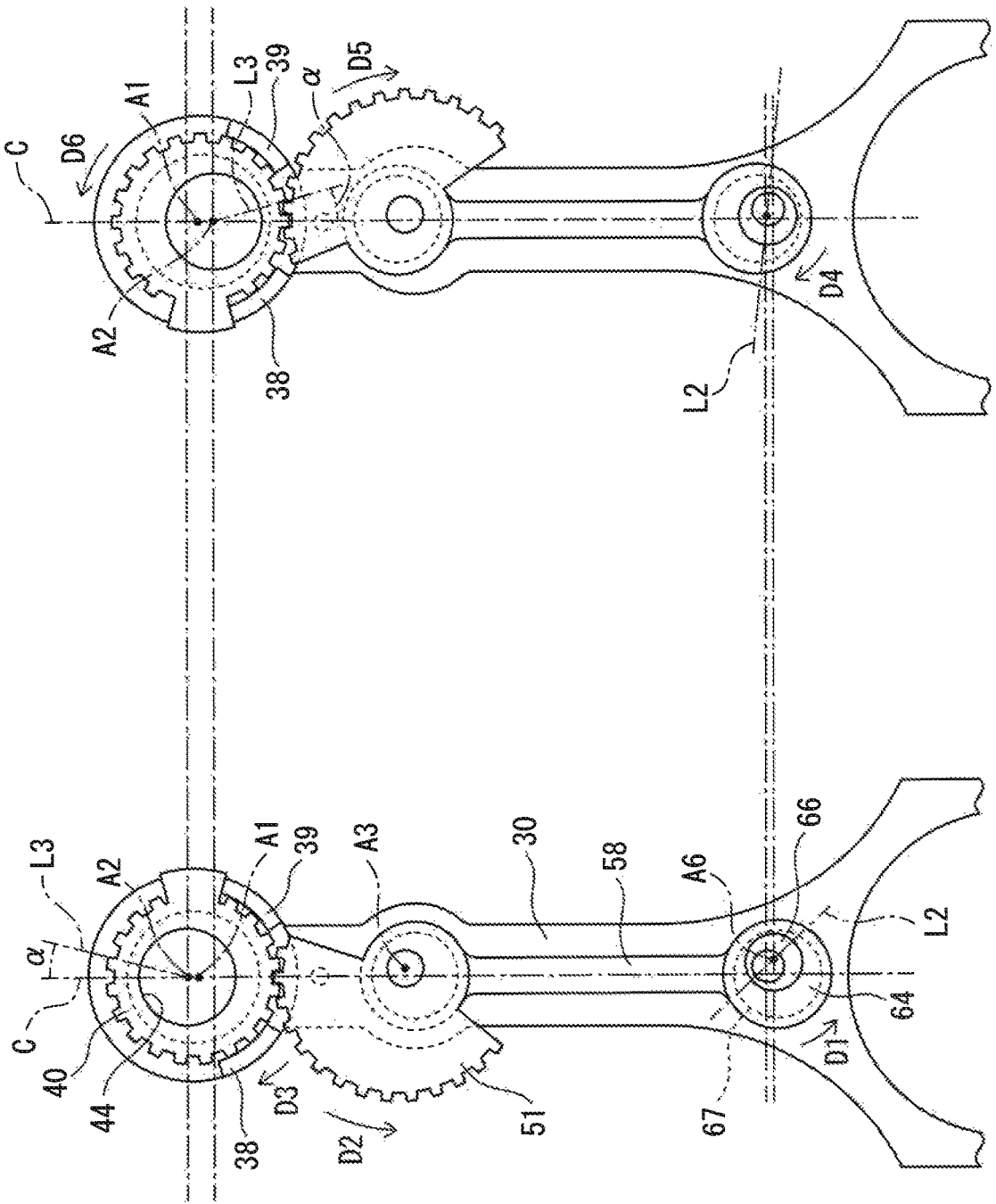

VARIABLE COMPRESSION RATIO MECHANISM

TECHNICAL FIELD

The present invention relates to a variable compression ratio mechanism.

BACKGROUND ART

Known since the past has been an internal combustion engine provided with a variable compression ratio mechanism, which can change a mechanical compression ratio of the internal combustion engine. As such a variable compression ratio mechanism, various types have been proposed, which include a type changing the effective length of a connecting rod used in the internal combustion engine. In this regard, the "effective length of a connecting rod" means a distance between an axis of a crank receiving opening for receiving a crank pin and an axis of a piston pin receiving opening for receiving a piston pin. Therefore, if the effective length of the connecting rod becomes longer, a volume of a combustion chamber when a piston is at compression top dead center becomes smaller and accordingly the mechanical compression ratio becomes higher. On the other hand, if the effective length of the connecting rod becomes shorter, the volume of the combustion chamber when the piston is at compression top dead center becomes larger and accordingly the mechanical compression ratio becomes lower.

As a variable length connecting rod able to be changed in effective length, one provided with an eccentric member, which can rotate with respect to a connecting rod body at a small end of the connecting rod body, is known (for example, PLTs 1 and 2). The eccentric member has a piston pin receiving opening receiving a piston pin. This piston pin receiving opening is formed so as to offset from a rotation axis of the eccentric member. In such a variable length connecting rod, if changing a rotation position of the eccentric member, it is possible to change the effective length of the connecting rod.

In variable length connecting rods provided with an eccentric member, a type provided with a drive gear meshing with a gear part formed at an outer circumferential surface of an eccentric member and a link mechanism coupled with this drive gear has been studied (for example, PLT 1). In particular, the variable length connecting rod described in PLT 1 is provided with two levers sticking out from the connecting rod body to the side thereof in the plane in which the variable length connecting rod moves along with rotation of the crankshaft (below, referred to as "movement plane"). One (first lever) of these two levers is coupled with the drive gear through the link mechanism. The other (second lever) thereof is coupled with a lock mechanism preventing the eccentric member from rotating.

In order to raise the mechanical compression ratio, the first lever and second lever are temporarily pushed down together. Due to this, the lock mechanism is released, the eccentric member rotates in one direction through the link mechanism and drive gear, and the mechanical compression ratio becomes higher. Conversely, in order to lower the mechanical compression ratio, only the second lever is temporarily pushed down. The first lever is biased in a direction pushed up by a spring provided in the variable length connecting rod. Therefore, if the second lever is pushed down and thereby the lock mechanism is released, the first lever is pushed up by the spring force. Along with this, the eccentric member rotates in the other direction through the link mechanism and drive gear, and thus the mechanical compression ratio becomes lower.

CITATION LIST

Patent Literature

PLT 1. WO2016/037696A
PLT 2. WO2014/019683A

SUMMARY OF INVENTION

Technical Problem

As explained above, in the variable length connecting rod described in PLT 1, two levers and a rod coupled with the levers are necessary. Further, the two levers are configured so as to stick out from the connecting rod body to the sides, a groove is provided at a part of the connecting rod body, and a spring is provided in the groove. In this way, the variable length connecting rod described in PLT 1 is complicated in structure. Also, the balance of weight of the variable length connecting rod itself greatly changes in accordance with the mechanical compression ratio.

The present invention was made in consideration of the above problem and has an object to provide a variable compression ratio mechanism having a variable length connecting rod able to change an effective length and having a new structure.

Solution to Problem

The present invention was made so as to solve the above problem and has as its gist the following.

(1) A variable compression ratio mechanism comprising a variable length connecting rod which can change an effective length between an axis of a piston pin receiving opening for receiving a piston pin and an axis of a crank receiving opening for receiving a crank pin, wherein the variable length connecting rod comprises:

a connecting rod body provided with the crank receiving opening;

an eccentric member provided with the piston pin receiving opening, provided at the connecting rod body rotatably to the connecting rod body, and configured so that the effective length changes if the eccentric member is rotated; and an eccentric member drive mechanism provided with a projecting pin projecting out from the connecting rod body with an angle with respect to a movement plane of the variable length connecting rod and configured to make the eccentric member rotate if a relative position of the projecting pin with respect to the connecting rod body changes, wherein the variable compression ratio mechanism further comprises a guide member attached to an engine body so as not to move together with the variable length connecting rod and guiding the projecting pin during operation of an internal combustion engine, and wherein the guide member guides the projecting pin so that a relative position of the projecting pin changes if the guide position is changed.

(2) The variable compression ratio mechanism according to the above (1), wherein the eccentric member is configured so that an axis of the piston pin receiving opening is offset from a rotation axis of the eccentric member;

the eccentric member drive mechanism is configured so that a rotation position of the eccentric member is a first rotation position when the projecting pin is at a first relative position with respect to the connecting rod body, and so that the rotation position of the eccentric member is a second rotation position where the effective length is shorter than the first rotation position when the projecting pin is at a second relative position with respect to the connecting rod body; and the guide member is configured to be switched between at least a first guide position and a second guide position to guide the projecting pin to the first relative position when the guide member is at the first guide position, and to guide the projecting pin to the second relative position when the guide member is at the second guide position.

(3) The variable compression ratio mechanism according to the above (2), wherein the first rotation position is a rotation position where an axis of the piston pin receiving opening is on an axis of the connecting rod body and positioned further away from an axis of the crank receiving opening than a rotation axis of the eccentric member, and the second rotation position is a rotation position where an axis of the piston pin receiving opening is on an axis of the connecting rod body and positioned closer to an axis of the crank receiving opening than a rotation axis of the eccentric member.

(4) The variable compression ratio mechanism according to the above (2) or (3), wherein the variable length connecting rod further comprises a lock mechanism for locking the eccentric member so that it does not rotate when the eccentric member is at the first rotation position and the second rotation position.

(5) The variable compression ratio mechanism according to any one of the above (2) to (4), wherein the guide member comprises a first guide rail and a second guide rail arranged facing each other, and is configured so that when the guide member is at the first guide position, the projecting pin is guided by the first guide rail to a first relative position and when the guide member is at the second guide position, the projecting pin is guided by the second guide rail to a second relative position.

(6) The variable compression ratio mechanism according to the above (5), wherein the guide member is configured so that the projecting pin moves through a guide passage between the first guide rail and the second guide rail during operation of the internal combustion engine, and the first guide rail and the second guide rail are formed so that a guide passage exit side in a direction of advance of the projecting pin becomes narrower in interval between the two than a guide passage entry side.

(7) The variable compression ratio mechanism according to any one of the above (2) to (6), wherein the guide member is rotatably attached to the engine body, and is configured so as to be able to move between the first guide position and the second guide position by rotating the guide member with respect to the engine body.

(8) The variable compression ratio mechanism according to any one of the above (2) to (7), wherein the eccentric member further comprises a projection projecting out from an outer surface outward in a radial direction and the connecting rod body further comprises a stop member arranged around the eccentric member, and the stop member is arranged so that the projection abuts against the stop member when the eccentric member is at the first rotation position and second rotation position.

(9) The variable compression ratio mechanism according to the above (8), wherein the eccentric member is configured so that an axis of the piston pin receiving opening is offset from a rotation axis of the eccentric member, the first rotation position is a rotation position where the axis of the piston pin receiving opening rotates further in one rotation direction than on the axis of the connecting rod body and a position where it is positioned further from the axis of the crank receiving opening than the rotation axis of the eccentric member, and the stop member is arranged so that when the eccentric member is at the first rotation position, the projection abuts against the stop member so that the eccentric member does not rotate more in that one rotation direction.

(10) The variable compression ratio mechanism according to the above (9), wherein the second rotation position is a rotation position where the axis of the piston pin receiving opening rotates more in the opposite direction from one rotation direction than on the axis of the connecting rod body, and a position where it is positioned closer to the axis of the crank receiving opening than the rotation axis of the eccentric member, and the stop member is arranged so that when the eccentric member is at the second rotation position, the projection abuts against the stop member so that the eccentric member does not rotate more in the direction opposite to that one rotation direction.

(11) The variable compression ratio mechanism according to any one of the above (1) to (10), wherein the eccentric member has a gear part formed with a gear at its outer circumference, the eccentric member drive mechanism comprises a drive gear rotatably attached to the connecting rod body and meshing with the gear part of the eccentric member; and a link mechanism provided with the projecting pin and coupled with the drive gear, and the link mechanism is configured so that if a relative position of the projecting pin changes, the rotation position of the drive gear is changed through the link mechanism.

(12) The variable compression ratio mechanism according to the above (11), wherein the drive gear comprises a first circular part having an axis offset from the rotation axis of the drive gear, and the link mechanism comprises at one end part a link member provided with a first ring part fitting with the first circular part.

(13) The variable compression ratio mechanism according to the above (12), wherein the link mechanism further comprises an eccentric rotation member rotatably attached to the connecting rod body and having the projecting pin fixed to it, the eccentric rotation member comprises a second circular part having an axis offset from the rotation axis of eccentric rotation member, and the projecting pin is fixed to the eccentric rotation member so that its axis is offset from the rotation axis of the eccentric rotation member, and the link member comprises a second ring part fitting with the second circular part at the end at the opposite side to the end where the first ring part is provided.

(14) The variable compression ratio mechanism according to any one of the above (11) to (13), wherein the variable length connecting rod further comprises a lock mechanism locking the eccentric member so as not to rotate when the eccentric member is in a predetermined rotation position, the drive gear comprises a recess on a side surface facing the connecting rod body, and the lock mechanism comprises a lock ball and a spring biasing the lock ball, and locks the eccentric member so as not to rotate by making the lock ball partially fit into the recess formed in the drive gear.

Advantageous Effect of Invention

According to the present invention, a variable compression ratio mechanism having a variable length connecting rod able to change an effective length and having a new structure, is provided.

BRIEF DESCRIPTION OF DRAWINGS

FIGS. 12A to 12C are schematic side views showing states of change in a variable length connecting rod when a position of a guide member is switched to a second guide position.

FIGS. 13A to 13C are schematic side views showing states of change in a variable length connecting rod when a position of a guide member is switched to a second guide position.

FIGS. 14A and 14B are a side view, similar to FIGS. 8A and 8B, schematically showing a variable length connecting rod.

DESCRIPTION OF EMBODIMENTS

Figure 1:
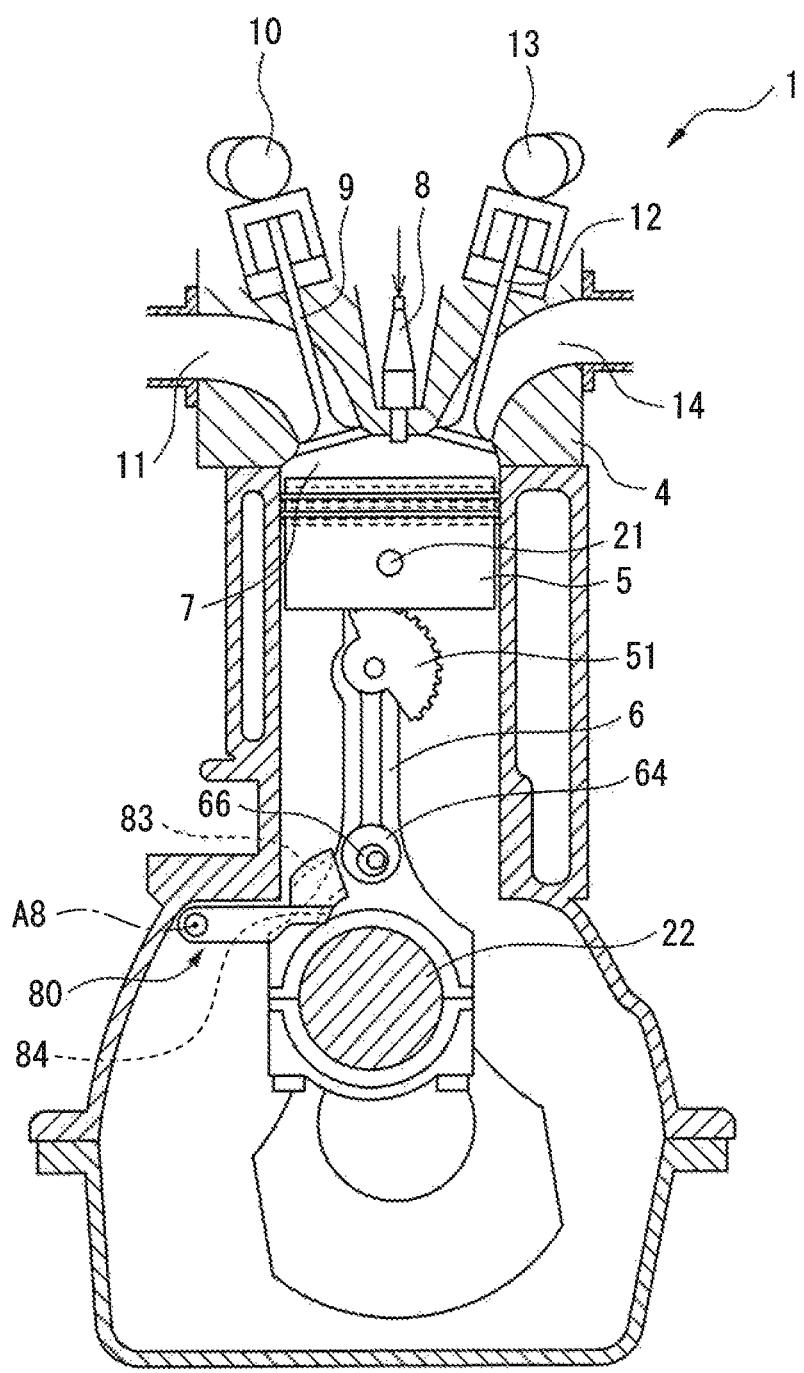
FIG. 1 is a schematic side cross-sectional view of an internal combustion engine provided with a variable compression ratio mechanism.

Below, referring to the drawings, embodiments of the present invention will be explained in detail. Note that, in the following explanation, similar components are assigned the same reference notations.

(Variable Compression Ratio Internal Combustion Engine)

Figure 2:
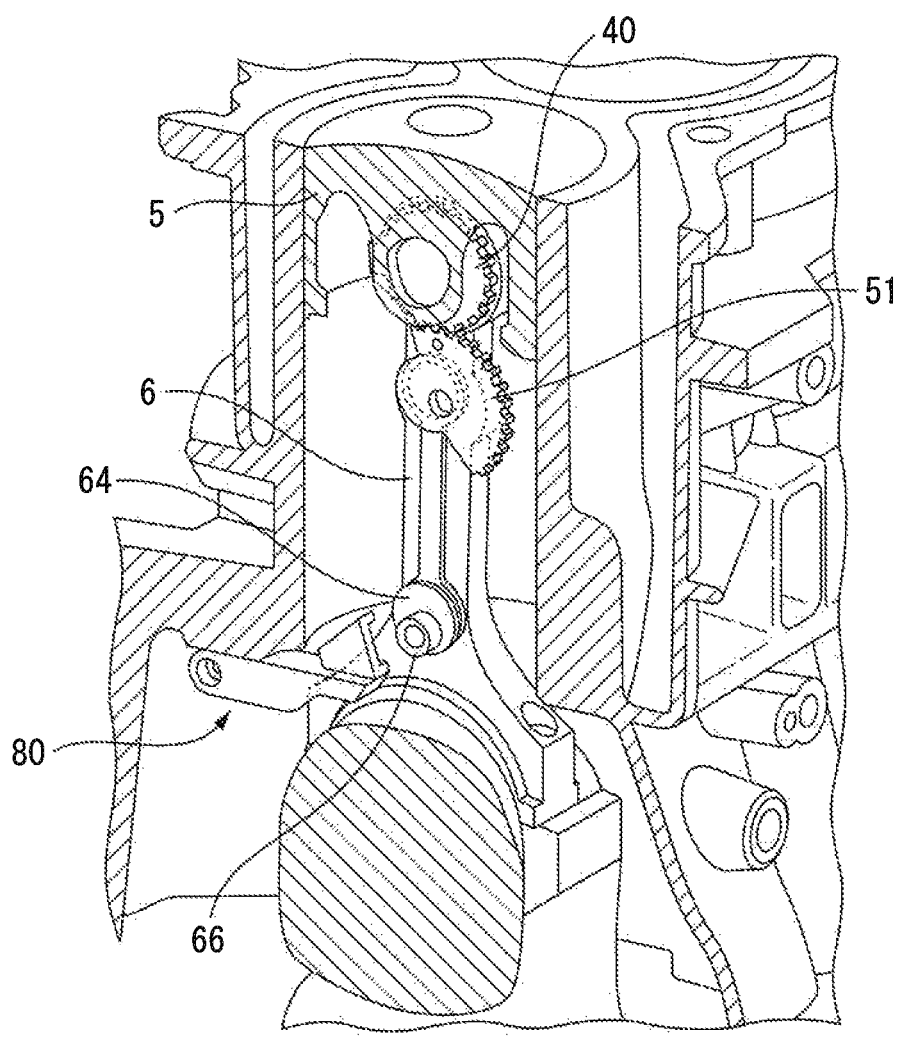
FIG. 2 is a schematic cross-sectional perspective view of an internal combustion engine provided with a variable compression ratio mechanism.

FIG. 1 is a schematic side cross-sectional view of an internal combustion engine comprising a variable compression ratio mechanism in the present embodiment. FIG. 2 is a schematic cross-sectional perspective view of an internal combustion engine comprising a compression ratio mechanism in the present embodiment. Referring to FIGS. 1 and 2, the internal combustion engine 1 comprises a crankcase 2, cylinder block 3, cylinder head 4, pistons 5, variable length connecting rods 6, combustion chambers 7, spark plugs 8 arranged at the center of the top surfaces of the combustion chambers 7, intake valves 9, an intake camshaft 10, intake ports 11, exhaust valves 12, an exhaust camshaft 13, and exhaust ports 14.

A variable length connecting rod 6 is coupled at its small end to a piston 5 by a piston pin 21, and is coupled at its big end to a crank pin 22 of the crankshaft. The variable length connecting rod 6, as explained later, can be changed in the distance from an axis of the piston pin 21 to an axis of the crank pin 22, that is, the effective length.

If the effective length of the variable length connecting rod 6 becomes longer, the length from the crank pin 22 to the piston pin 21 becomes longer, and therefore, as shown by the solid line in FIG. 1, the volume of the combustion chamber 7 when the piston 5 is at top dead center becomes smaller. On the other hand, even if the effective length of the variable length connecting rod 6 changes, the stroke length, by which the piston 5 reciprocatingly moves in the cylinder, does not change. Therefore, at this time, the mechanical compression ratio in the internal combustion engine 1 becomes larger.

On the other hand, if the effective length of the variable length connecting rod 6 becomes shorter, the length from the crank pin 22 to the piston pin 21 becomes shorter, and therefore, as shown by the broken line in FIG. 1, the volume of the combustion chamber 7 when the piston 5 is at top dead center becomes larger. However, as explained above, the stroke length of the piston 5 is constant. Therefore, at this time, the mechanical compression ratio in the internal combustion engine 1 becomes smaller.

(Configuration of Variable Length Connecting Rod)

Figure 3:
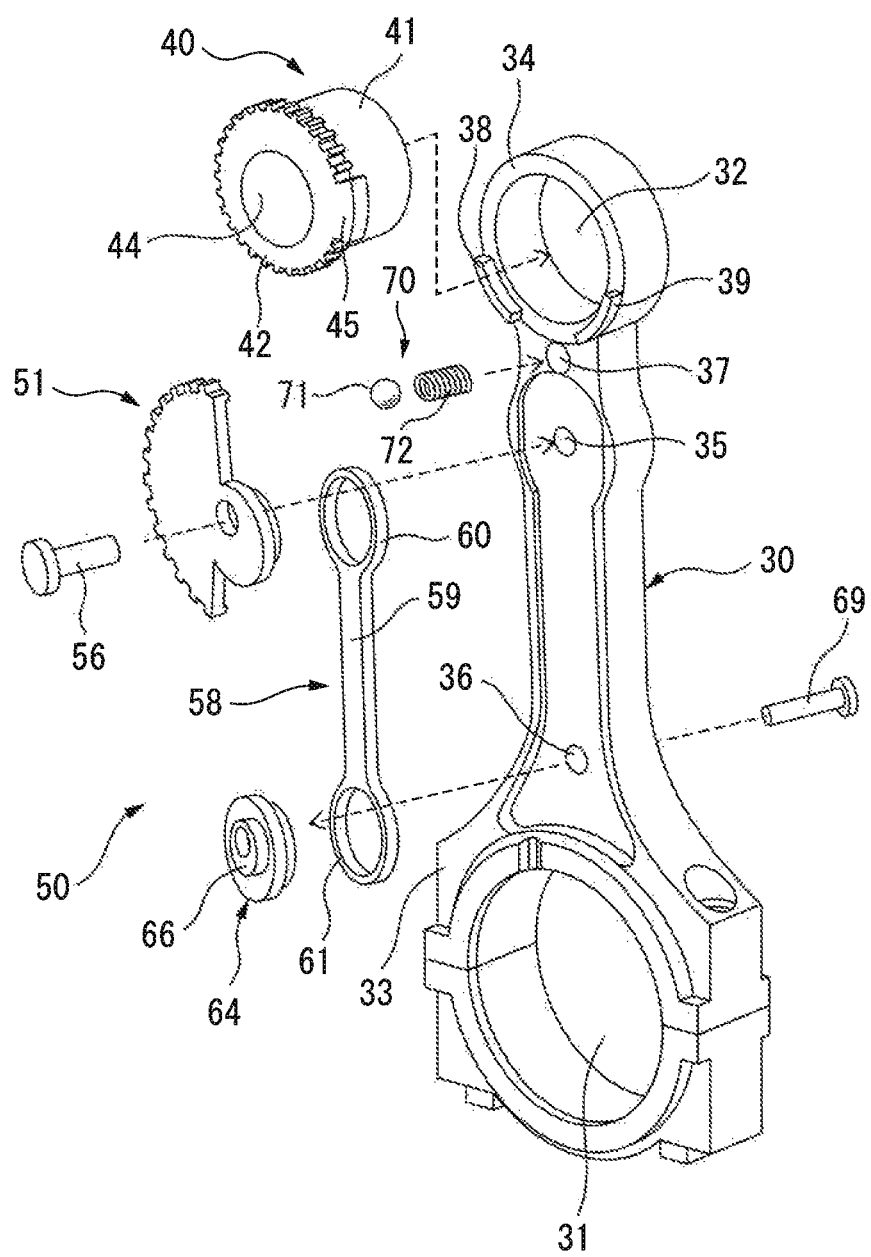
FIG. 3 is a disassembled perspective view schematically showing a variable length connecting rod.
Figure 4:
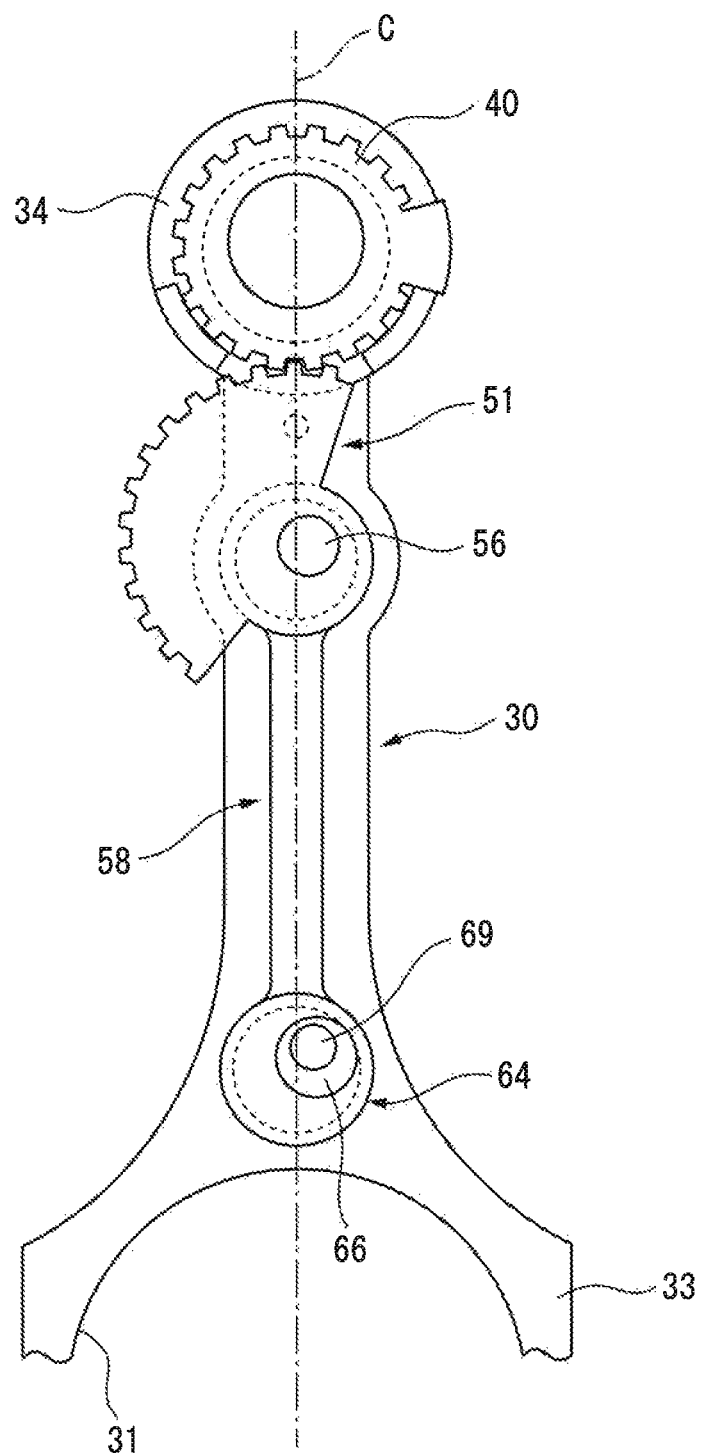
FIG. 4 is a side view schematically showing a variable length connecting rod.

The variable compression ratio mechanism according to the present embodiment comprises the variable length connecting rod 6. Below, referring to FIG. 3 to FIG. 7, the variable length connecting rod 6 will be explained. FIG. 3 is a disassembled perspective view schematically showing the variable length connecting rod 6 according to the present embodiment, while FIG. 4 is a side view schematically showing the variable length connecting rod 6 according to the present embodiment. As shown in FIGS. 3 and 4, the variable length connecting rod 6 comprises a connecting rod body 30, an eccentric member 40 rotatably attached to the connecting rod body 30, an eccentric member drive mechanism 50 attached to the connecting rod body 30, and a lock mechanism 70.

First, the connecting rod body 30 will be explained. The connecting rod body 30 has a crank receiving opening 31 for receiving a crank pin 22 of the crankshaft at one end, and has a sleeve receiving opening 32 for receiving a sleeve of a later explained eccentric member 40 at the other end. The crank receiving opening 31 is larger than the sleeve receiving opening 32. For this reason, the end of the connecting rod body 30 positioned at the side where the crank receiving opening 31 is provided (crankshaft side) will be called the "big end 33", while the end of the connecting rod body 30 positioned at the side where the sleeve receiving opening 32 is provided (piston side) will be called the "small end 34". Further, the line connecting the axis of the crank receiving opening 31 and the axis of the sleeve receiving opening 32 will be called the center axis C of the connecting rod body 30.

Further, the connecting rod body 30 comprises, on one side surface, a first anchoring hole 35, second anchoring hole 36, and holding hole 37, adjacently to the center axis C. These first anchoring hole 35, second anchoring hole 36, and holding hole 37 are formed so as to extend perpendicularly to the side surface of the connecting rod body 30 where the eccentric member drive mechanism 50 is provided. In the present embodiment, the holding hole 37, first anchoring hole 35, and second anchoring hole 36 are arranged in that order from the small end 34 to the big end 33. Further, in the present embodiment, the first anchoring hole 35 and second anchoring hole 36 are formed as holes passing through the connecting rod body 30. The holding hole 37 is formed as a hole not passing through the connecting rod body 30.

In addition, the connecting rod body 30 comprises two stop members 38 and 39 at the small end 34 around the sleeve receiving opening 32. The stop members 38 and 39 stick out at the small end 34 from the side surface of the connecting rod body 30 where the eccentric member drive mechanism 50 is provided. In the present embodiment, the stop members 38 and 39 are provided at the two sides of a center axis C of the connecting rod body 30 symmetrically with respect to this center axis C. Further, in the present embodiment, the stop members 38 and 39 are formed in arc shapes extending by fixed lengths in the circumferential direction of the sleeve receiving opening 32.

Figure 5:
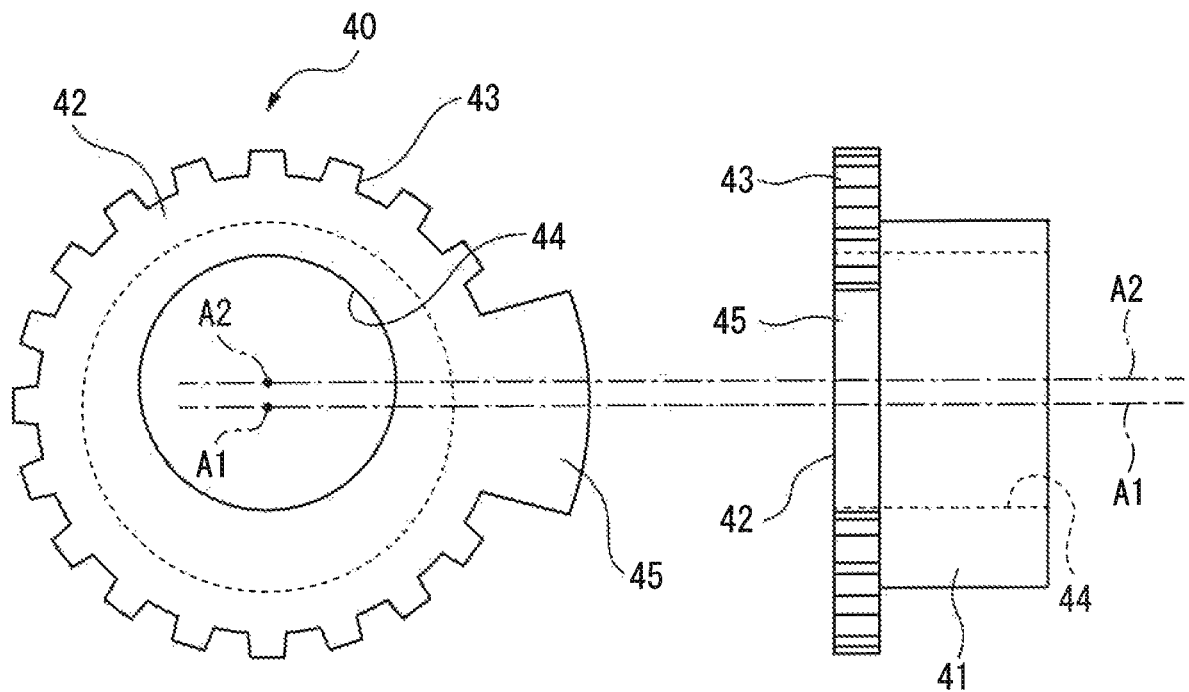
FIG. 5 gives a plan view and side view of an eccentric member.

Next, referring to FIGS. 3 to 5, the eccentric member 40 will be explained. FIG. 5 gives a plan view and side view of the eccentric member 40. The eccentric member 40 is rotatably attached to the connecting rod body 30 and is configured so that the effective length of the variable length connecting rod 6 changes if it is rotated.

The eccentric member 40 comprises a cylindrical sleeve 41 received in the sleeve receiving opening 32 formed in the connecting rod body 30 and a gear part 42 provided on a side surface of the sleeve 41. The sleeve 41 has a cylindrical outer circumferential surface and can rotate in the sleeve receiving opening 32. By the sleeve 41 rotating in the sleeve receiving opening 32, the eccentric member 40 rotates with respect to the connecting rod body 30.

The gear part 42 is a plate formed with a gear at its outer circumference and is joined with the side surface of the sleeve 41. The gear part 42 is formed so that the gear 43 is arranged at the outside from the outer circumferential surface of the sleeve 41. In addition, the gear part 42 comprises, at part of its outer circumference, a projection 45 sticking out from the gear 43 outward in the radial direction.

The gear part 42 is formed concentrically with the sleeve 41. Therefore, the axis of the gear of the gear part 42 and the axis of the sleeve 41 are coaxial. These axes are represented by A1 in FIG. 5. When the sleeve 41 rotates in the sleeve receiving opening 32, that is, when the eccentric member 40 rotates with respect to the connecting rod body, it rotates about this axis A1. In addition, this rotation axis A1 basically matches the axis of the sleeve receiving opening 32.

The sleeve 41 and the gear part 42 of the eccentric member 40 are formed with a piston pin receiving opening 44 for receiving the piston pin 21. This piston pin receiving opening 44 is formed in a cylindrical shape. The cylindrical piston pin receiving opening 44 is formed so that its axis A2 is parallel with the axes A1 of the sleeve 41 and the gear part 42, but is not coaxial, that is, is offset therefrom. Therefore, the axis of the piston pin 21 is offset from the rotation axis of the eccentric member 40.

In this way, in the present embodiment, the axis A2 of the piston pin receiving opening 44 of the sleeve 41 is offset from the rotation axis A1 of the eccentric member 40. For this reason, if the eccentric member 40 rotates, the position of the piston pin receiving opening 44 in the sleeve receiving opening 32 changes. When the piston pin receiving opening 44 is positioned at the big end 33 side in the sleeve receiving opening 32, the effective length of the variable length connecting rod 6 is short. Conversely, when the piston pin receiving opening 44 is positioned at the side opposite to the big end 33 side in the sleeve receiving opening 32, the effective length of the variable length connecting rod 6 is long. Therefore, according to the present embodiment, it is possible to make the effective length of the variable length connecting rod 6 change, by rotating the eccentric member 40.

Next, referring to FIGS. 3, 4, 6, and 7, the eccentric member drive mechanism 50 will be explained. The eccentric member drive mechanism 50 is configured to drive the eccentric member 40 to rotate, and comprises a drive gear 51, link member 58, and eccentric rotation member 64.

Figure 6:
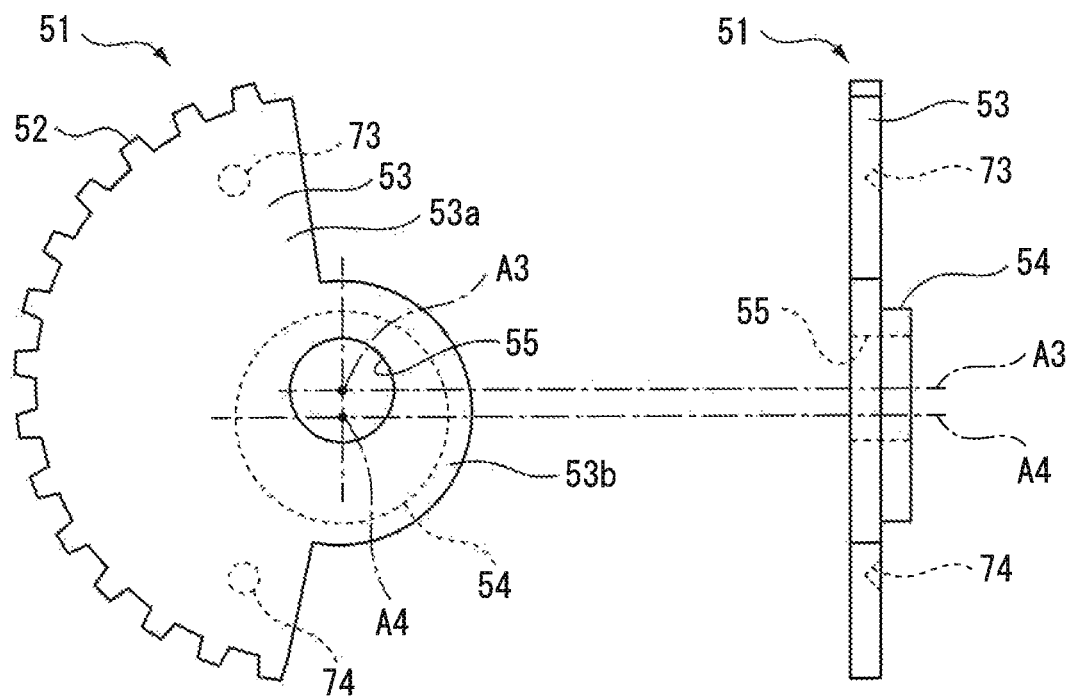
FIG. 6 gives a plan view and side view of a drive gear.

FIG. 6 gives a plan view and side view of the drive gear 51. The drive gear 51 is rotatably attached to the connecting rod body 30. The drive gear 51 is configured to mesh with the gear of the eccentric member 40 so that when the drive gear 51 is rotated, the eccentric member 40 rotates. The drive gear 51, as shown in FIG. 6, comprises a fan-shaped gear part 53 formed with a gear 52 at its outer circumference, and a first circular plate part 54 having a circular shape. In the present embodiment, the fan-shaped gear part 53 and the first circular plate part 54 are integrally formed from a single material, but they may also be formed from separate members and then joined to each other. The fan-shaped gear part 53 comprises a fan-shaped part 53a formed with a gear 52 at its outer circumference, and a semicircular shaped part 53b joined with the fan-shaped part 53a and having a radius smaller than the fan-shaped part 53a. The fan-shaped gear part 53 is formed so that the axis A3 of the gear 52 formed at the outer circumference of the semicircular shaped part 53b and the axis A4 of the semicircular shaped part 53b are parallel but not coaxial, that is, are offset from each other. Further, the first circular plate part 54 is joined with the fan-shaped gear part 53 so that the axis thereof is coaxial with the axis A4 of the semicircular shaped part 53b.

The drive gear 51 is provided with a cylindrical first through hole 55 extending through the fan-shaped gear part 53 and first circular plate part 54. This first through hole 55 is formed so that its axis is coaxial with the axis A3 of the gear 52 of the fan-shaped gear part 53. As shown in FIG. 3, a first anchoring pin 56 is inserted into this first through hole 55. This first anchoring pin 56 is received in the first anchoring hole 35 formed at the connecting rod body 30. Therefore, the first anchoring pin 56 is anchored at the connecting rod body 30. For this reason, by this first anchoring pin 56, the drive gear 51 is attached to the connecting rod body 30 rotatably about the axis of the first anchoring pin 56, that is, about the axis A3 of the first through hole 55. Therefore, the axis A3 can be said to be the rotation axis of the drive gear 51.

Since the axis A3 of the first through hole 55 and the axis A4 of the first circular plate part 54 are offset from each other, if the drive gear 51 rotates about the rotation axis A3, the first circular plate part 54 moves so that its axis A4 rotates about the rotation axis A3. Conversely speaking, if the first circular plate part 54 moves about the rotation axis A3 in the vertical direction (directions moving away from and approaching the big end 33), the drive gear 51 rotates about the axis A3.

Figure 7:
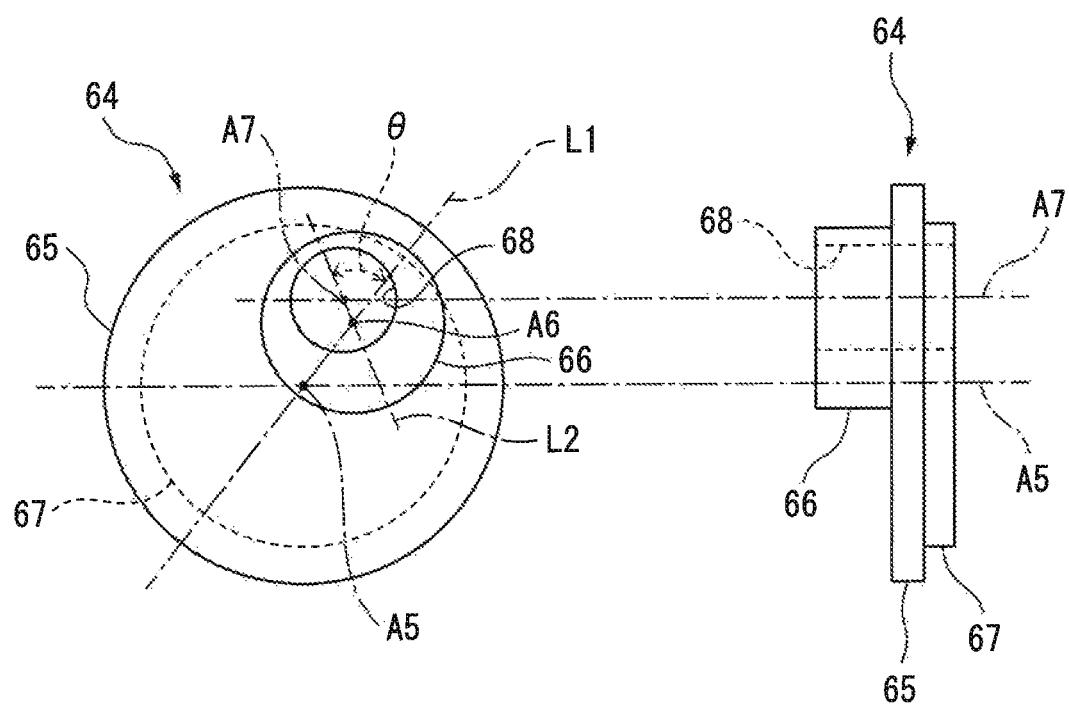
FIG. 7 gives a plan view and side view of an eccentric rotation member.

FIG. 7 gives a plan view and side view of the eccentric rotation member 64. The eccentric rotation member 64 is a member rotatably arranged to the connecting rod body 30. The eccentric rotation member 64 comprises a base plate part 65 having a circular shape, a projecting pin 66 sticking out from the base plate part 65, and a second circular plate part 67 having a circular shape with a smaller radius than the base plate part 65. The second circular plate part 67 is joined to the surface of the base plate part 65 at the opposite side to the surface where the projecting pin 66 is provided. In the present embodiment, the base plate part 65, projecting pin 66, and second circular plate part 67 are formed integrally from a single material, but they may also be formed from separate members and then joined to each other.

The second circular plate part 67 is joined to the base plate part 65 so that its axis is coaxial with the axis of the base plate part 65 (axis A5). The second circular plate part 67 of the eccentric rotation member 64 preferably has a circular shape with a radius the same as the radius of the circular shape of the first circular plate part 54 of the drive gear 51.

On the other hand, the projecting pin 66 is formed in a cylindrical shape smaller in radius than the second circular plate part 67. The projecting pin 66 is joined to the base plate part 65 so that its axis A6 is parallel with the axis A5 of the base plate part 65, but not coaxial thereto, that is, to be offset therefrom. Further, in the present embodiment, the projecting pin 66 sticks out perpendicularly from the base plate part 65. In other words, in the present embodiment, the projecting pin 66 can be said to be sticking out perpendicularly to the movement plane of the variable length connecting rod 6. Note that, the projecting pin 66 does not necessarily have to stick out perpendicularly from the base plate part 65. It is sufficient that it be attached to the base plate part 65 with an angle. Therefore, the projecting pin 66 may stick out from the connecting rod body 30 with an angle with respect to the movement plane of the variable length connecting rod 6.

The eccentric rotation member 64 is provided with a cylindrical second through hole 68 extending through the base plate part 65, projecting pin 66, and second circular plate part 67. This second through hole 68 is formed so that its axis A7 is parallel with the axis A5 of the base plate part 65 and the axis A6 of the projecting pin 66, but not coaxial, that is, so that it is offset from these axes A5 and A6. As shown in FIG. 3, a second anchoring pin 69 inserted into this second through hole 68. This second anchoring pin 69 is received in the second anchoring hole 36 of the connecting rod body 30. Therefore, second anchoring pin 69 is anchored to the connecting rod body 30. For this reason, due to the second anchoring pin 69, the eccentric rotation member 64 is attached to the connecting rod body 30 so as to be able to rotate about the axis of the second anchoring pin 69, that is, about the axis A7 of the second through hole 68. Therefore, the axis A7 can be said to be the rotation axis of the eccentric rotation member 64.

The projecting pin 66, second circular plate part 67, and second through hole 68 are formed so that a first line L1 connecting the axis A5 of the second circular plate part 67 and the axis A6 of the projecting pin 66 and a second line L2 connecting the axis A7 of the second through hole 68 and the axis A6 of the projecting pin 66 intersect at a predetermined angle θ. Note that, in the present embodiment, when the axis A5, axis A6, and axis A7 are positioned in that order on a straight line, the angle θ is expressed as 0°, while when the axis A7 is positioned between the axis A5 and the axis A6 and these axes are positioned on a straight line, the angle θ is expressed as 180°. Whatever the case, the first line L1 and the second line L2 are formed so that the angle θ is not 0° or 180°. In the example shown in FIG. 7, the angle 6 is an angle of less than 90°, but it may also be 90° or may be an angle larger than 90°.

Since the axis A7 of the second through hole 68 and the axis A5 of the second circular plate part 67 are offset from each other, if the eccentric rotation member 64 rotates about the rotation axis A7, the second circular plate part 67 moves so that its axis A5 rotates about the rotation axis A7. Conversely speaking, if the second circular plate part 67 moves about the rotation axis A7 in the vertical direction (directions moving away from and approaching the small end 34), the eccentric rotation member 64 rotates about the rotation axis A7.

Further, since the axis A7 of the second through hole 68 and the axis A6 of the projecting pin 66 are offset from each other, if the eccentric rotation member 64 rotates about the rotation axis A7, the projecting pin 66 moves so that its axis A6 rotates about the rotation axis A7. Conversely speaking, if the projecting pin 66 moves about the rotation axis A7 in the vertical direction (directions moving away from and approaching the small end 34), the eccentric rotation member 64 rotates about the rotation axis A7.

The link member 58 is a member coupled with the drive gear 51 and eccentric rotation member 64, and configured to make them cooperate to each other. The link member 58 comprises a link member body 59, first ring part 60 formed at one end of the link member body 59, and second ring part 61 formed at the other end part of the link member body 59.

The first ring part 60 is formed so as to have an inner diameter substantially the same as the outer diameter of the first circular plate part 54 of the drive gear 51. As a result, the first circular plate part 54 of the drive gear 51 fits with the first ring part 60 so as to rotate in the first ring part 60. Similarly, the second ring part 61 is formed so as to have an inner diameter substantially the same as the outer diameter of the second circular plate part 67 of the eccentric rotation member 64. As a result, the second circular plate part 67 of the eccentric rotation member 64 fits with the second ring part 61 so as to rotate within the second ring part 61.

In this way, the link member 58 comprises a first ring part 60 fitting with the first circular plate part 54 of the drive gear 51 and a second ring part 61 fitting with the second circular plate part 67 of the eccentric rotation member 64. For this reason, the drive gear 51 and the eccentric rotation member 64 may be rotated so as to cooperate to each other. For example, if the eccentric rotation member 64 rotates about the rotation axis A7 so that the second circular plate part 67 moves upward (in the direction approaching small end 34), the drive gear 51 rotates about the rotation axis A3 so that the first circular plate part 54 moves upward (in the direction moving away from big end 33), through the link member 58. Conversely, if the eccentric rotation member 64 rotates about the rotation axis A7 so that the second circular plate part 67 moves downward (in the direction moving away from small end 34), the drive gear 51 rotates about the rotation axis A3 so that the first circular plate part 54 moves downward (in the direction approaching big end 33), through the link member 58.

The lock mechanism 70 is a mechanism for locking the eccentric member 40 at a predetermined rotation position. The lock mechanism 70 comprises a lock ball 71 and spring 72, which are held in a holding hole 37 formed in the connecting rod body 30. The holding hole 37 is arranged at a position facing a side surface of the drive gear 51. The lock ball 71 held in the holding hole 37 is biased by the spring 72 so as to stick out from the holding hole 37, that is, so as to abut against the side surface of the drive gear 51.

The side surface of the drive gear 51 facing the connecting rod body 30 is provided with two conical recesses 73 and 74. The recesses 73 and 74 are configured so that when the drive gear 51 is at predetermined rotation positions and, therefore, when the eccentric member 40 meshing with the drive gear 51 is at predetermined rotation positions, the recesses 73 and 74 face the holding hole 37 of the connecting rod body 30 and partially receive the lock ball 71. When in this way the lock ball 71 is partially received in the recesses 73 and 74, rotation of the drive gear 51 is obstructed by the lock ball 71 and the drive gear 51 is locked, therefore the eccentric member 40 is locked. However, the lock mechanism 70 is formed so that the lock ball 71 slips out from the recesses 73 and 74 when as explained later operation of the projecting pin 66 makes the eccentric member 40 rotate.

In the present embodiment, the first recess 73 is arranged so as to face the holding hole 37 of the connecting rod body 30 when the drive gear 51 is at a later explained drive gear first rotation position, that is, when the eccentric member 40 is at an eccentric member first rotation position. In addition, the second recess 74 is arranged so as to face the holding hole 37 of the connecting rod body 30 when the drive gear 51 is at a later explained drive gear second rotation position, that is, when the eccentric member 40 is at an eccentric member second rotation position.

(Operation of Variable Length Connecting Rod)

Figure 8B:
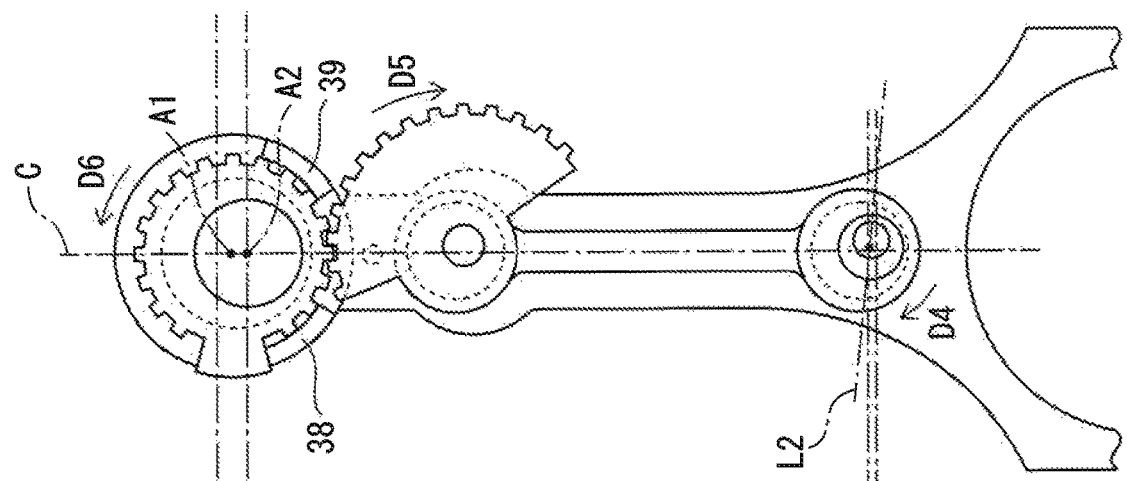
FIGS. 8A and 8B are a side view schematically showing a variable length connecting rod.
Figure 8A:
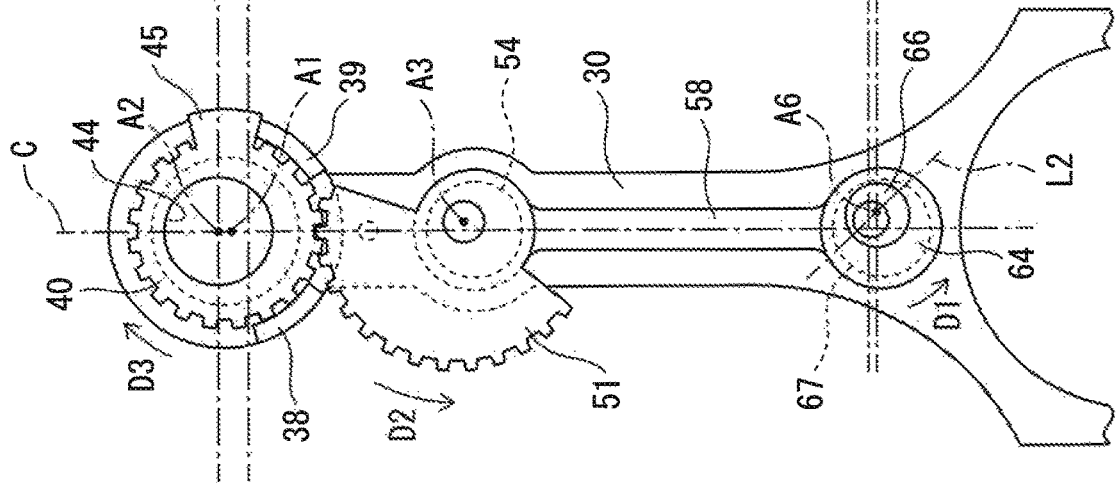

Next, referring to FIGS. 8A and 8B, the operation of the variable length connecting rod configured as explained above, will be explained. FIGS. 8A and 8B are side views schematically showing the variable length connecting rod 6. FIG. 8A shows the state where the effective length of the variable length connecting rod 6 is long and thus the mechanical compression ratio is high, while FIG. 8B shows the state where the effective length of the variable length connecting rod 6 is short and thus the mechanical compression ratio is low.

In the example shown in FIG. 8A, the eccentric rotation member 64 is at a rotation member first rotation position where it is rotated the most in the counterclockwise direction (in the direction of arrow D1 in figure) within the rotatable range. At this time, as will be understood from FIG. 8A, the projecting pin 66 is positioned about the rotation axis A7 relatively downward (more precisely, lower side in direction perpendicular to direction of advance of projecting pin 66 in region where later explained guide member is provided during operation of the internal combustion engine). Below, such a position of the projecting pin 66 with respect to the connecting rod body 30 will be referred to as the "first relative position". Further, the second circular plate part 67 of the eccentric rotation member 64 is positioned about the rotation axis A7 relatively downward (big end 33 side).

In this way, if the eccentric rotation member 64 is at the rotation member first rotation position, the second circular plate part 67 is positioned relatively downward, and therefore the first circular plate part 54 of the drive gear 51 coupled with the second circular plate part 67 through the link member 58 is also positioned around the rotation axis A3 relatively downward (big end 33 side). As a result, the drive gear 51 is positioned at the drive gear first rotation position where it is rotated about the rotation axis A3 the most in the counterclockwise direction (in the direction of arrow D2 in figure) within the rotatable range.

When the drive gear 51 is at the drive gear first rotation position, the eccentric member 40 meshing with the drive gear 51 is positioned at the eccentric member first rotation position where it is rotated about the rotation axis A1 the most in the clockwise direction (in the direction of arrow D3 in figure) within the rotatable range. When in this way the eccentric member 40 is at the eccentric member first rotation position, as shown in FIG. 8A, the axis A2 of the piston pin receiving opening 44 is positioned on the center axis C of the connecting rod body 30. In the present embodiment, at this time, the axis A2 of the piston pin receiving opening 44 is positioned further away from the crank receiving opening 31 than the axis A1 of the sleeve receiving opening 32. Therefore, at this time, the axis A2 of the piston pin receiving opening 44 is positioned the furthest away from the axis of the crank receiving opening 31 and accordingly the variable length connecting rod 6 can be said to be in a state where the effective length is the longest.

Therefore, in the present embodiment, if the projecting pin 66 is at a first relative position with respect to the connecting rod body 30, the eccentric rotation member 64 is positioned at the rotation member first rotation position, the drive gear 51 is positioned at the drive gear first rotation position, the eccentric member 40 is positioned at the eccentric member first rotation position, and, as a result, the effective length of the variable length connecting rod 6 is the longest. Therefore, if the projecting pin 66 is at the first relative position with respect to the connecting rod body 30, the mechanical compression ratio is high.

Further, when the drive gear 51 is positioned at the drive gear first rotation position, the first recess 73 of the drive gear 51 is aligned with the holding hole 37 of the connecting rod body 30. Accordingly, the lock ball 71 of the lock mechanism 70 is partially received in the first recess 73. Therefore, the lock mechanism 70 locks the eccentric rotation member 64, drive gear 51, and eccentric member 40 so as not to rotate when the drive gear 51 is positioned at the drive gear first rotation position, that is, the eccentric member 40 is at the eccentric member first rotation position.

In the example shown in FIG. 8B, the eccentric rotation member 64 is at a rotation member second rotation position where it is rotated the most in the clockwise direction (in the direction of arrow D4 in figure) within the rotatable range. At this time, as will be understood from FIG. 8B, the projecting pin 66 is positioned about the rotation axis A7 relatively upward (more precisely, upper side in direction perpendicular to direction of advance of projecting pin 66 in region where later explained guide member is provided during operation of the internal combustion engine). Below, such a position of the projecting pin 66 with respect to the connecting rod body 30 will be referred to as the "second relative position". Further, the second circular plate part 67 of the eccentric rotation member 64 is positioned about the rotation axis A7 relatively upward (small end 34 side).

In this way, if the eccentric rotation member 64 is at the rotation member second rotation position, the second circular plate part 67 is positioned relatively upward, and therefore the first circular plate part 54 of the drive gear 51 coupled with the second circular plate part 67 through the link member 58, is positioned about the rotation axis A3 relatively upward (small end 34 side). As a result, the drive gear 51 is positioned at the drive gear second rotation position where it is rotated about the rotation axis A3 the most in the clockwise direction (in the direction of arrow D5 in figure) within the rotatable range.

When the drive gear 51 is positioned at the drive gear second rotation position, the eccentric member 40 meshing with the drive gear 51 is positioned at the eccentric member second rotation position where it is rotated about the rotation axis A1 the most in the counterclockwise direction (in the direction of arrow D6 in figure) within the rotatable range. When in this way the eccentric member 40 is at the eccentric member second rotation position, as shown in FIG. 8B, the axis A2 of the piston pin receiving opening 44 is positioned on the center axis C of the connecting rod body 30. In the present embodiment, at this time, the axis A2 of the piston pin receiving opening 44 is positioned closer to the crank receiving opening 31 than the axis A1 of the sleeve receiving opening 32. Therefore, at this time, the axis A2 of the piston pin receiving opening 44 is at a position the closest to the axis of the crank receiving opening 31. Accordingly, the variable length connecting rod 6 can be said to be in a state with the shortest effective length.

Therefore, in the present embodiment, if the projecting pin 66 is at the second relative position with respect to the connecting rod body 30, the eccentric rotation member 64 is positioned at the rotation member second rotation position, the drive gear 51 is positioned at the drive gear second rotation position, the eccentric member 40 is positioned at the eccentric member second rotation position, and, as a result, the effective length of the variable length connecting rod 6 is the shortest. Therefore, when the projecting pin 66 is at the second relative position with respect to the connecting rod body 30, the mechanical compression ratio is low.

Further, when the drive gear 51 is positioned at the drive gear second rotation position, the second recess 74 of the drive gear 51 is aligned with the holding hole 37 of the connecting rod body 30 and, accordingly, the lock ball 71 of the lock mechanism 70 is partially received in the second recess 74. Therefore, when the drive gear 51 is positioned at the drive gear second rotation position, that is, when the eccentric member 40 is at the eccentric member second rotation position, the lock mechanism 70 locks the eccentric rotation member 64, drive gear 51, and eccentric member 40 so as not to rotate.

From the above, in the variable length connecting rod 6 according to the present embodiment, the eccentric member drive mechanism 50 comprising the drive gear 51, link member 58, and eccentric rotation member 64, can be said to be configured so that if the relative position of the projecting pin 66 with respect to the connecting rod body 30 changes, the eccentric member 40 rotates.

Further, the variable length connecting rod 6 according to the present embodiment can be said to have a link mechanism configured from a link member 58 and eccentric rotation member 64. The link mechanism comprises a projecting pin 66 and is connected with the drive gear 51. Further, the link mechanism can be said to be configured so that if the relative position of the projecting pin 66 with respect to the connecting rod body 30 changes, the rotation position of the drive gear 51 changes, through this link mechanism.

(Configuration of Guide Member)

The variable compression ratio mechanism according to the present embodiment comprises a guide member 80, which is attached to the engine body so as not to move together with the variable length connecting rod 6 (in particular, so as not to move with respect to the engine body). The guide member 80 guides the projecting pin 66 during operation of the internal combustion engine. Below, referring to FIGS. 1, 2, and 9, the guide member 80 will be explained.

The guide member 80 is, specifically, attached to the crankcase 2 or cylinder block 3. In the present embodiment, the guide member 80 is attached to the cylinder block 3 rotatably about the rotation axis A8. Further, the number of guide members 80 is the same as the number of the variable length connecting rods 6, that is, the number of cylinders. Each guide member 80 is arranged so as to face the side surface of the variable length connecting rod 6 where the projecting pin 66 is provided.

Figure 9:
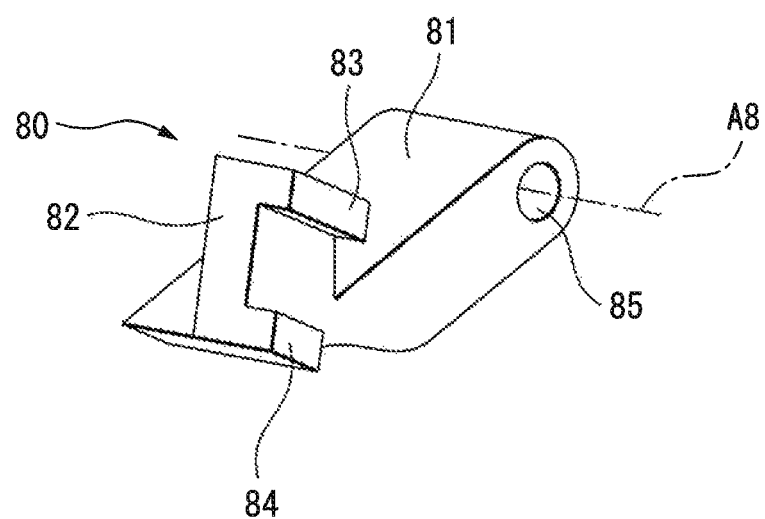
FIG. 9 is a perspective view schematically showing a guide member.

FIG. 9 is a perspective view schematically showing a guide member 80. As shown in FIG. 9, the guide member 80 comprises a guide member body 81, a rail holding part 82 provided at one end of the guide member body 81, a first guide rail 83 and second guide rail 84 provided at the rail holding part 82, and a through hole 85 provided at the other end of the guide member body 81.

The rail holding part 82 is configured so as to hold the first guide rail 83 and second guide rail 84, and is formed so as to extend perpendicularly to the guide member body 81. Further, the side surface of the rail holding part 82 facing the variable length connecting rod 6 is formed so as to be flush with the side surface of the guide member body 81 facing the variable length connecting rod 6.

The first guide rail 83 and second guide rail 84 guide the projecting pin 66 in accordance with the guide position of the guide member 80. The first guide rail 83 and second guide rail 84 are joined to the rail holding part 82 so as to stick out from the side surface of the rail holding part 82 facing the variable length connecting rod 6. The first guide rail 83 and second guide rail 84 are both formed in arc shapes at the plane parallel to the side surface of the rail holding part 82. These guide rails 83 and 84 are arranged at the rail holding part 82 so as to face each other.

The through hole 85 extends perpendicularly with respect to the side surface of the rail holding part 82 facing the variable length connecting rod 6. A shaft (not shown) is inserted into the through hole 85. In particular, the guide member 80 is fastened to the shaft so that if the shaft rotates about the axis thereof, the guide member 80 rotates about the axis of the shaft, that is, about the axis of the through hole 85. The shaft is coupled with a drive actuator (not shown) for the guide member 80 and the guide member 80 is driven to rotate by this drive actuator.

The guide member 80 configured in this way, as explained above, is arranged so as face the side surface of the variable length connecting rod 6 where the projecting pin 66 is provided. At this time, the guide member 80 is arranged so that the first guide rail 83 and second guide rail 84 are positioned at the two sides of the path through which the rotation axis A7 of the projecting pin 66 passes when the variable length connecting rod 6 is engaging in reciprocating motion and swinging motion along with operation of the internal combustion engine. More particularly, the guide member 80 is arranged so that the first guide rail 83 is positioned at the cylinder head 4 side from the path through which the rotation axis A7 of the projecting pin 66 passes and so that the second guide rail 84 is positioned at the crankcase side from the path through which the rotation axis A7 of the projecting pin 66 passes. Therefore, the guide member 80 is arranged so that the first guide rail 83 and second guide rail 84 are positioned on the same plane as the projecting pin 66 in the plane parallel to the movement plane. For this reason, the projecting pin 66 passes between the first guide rail 83 and the second guide rail 84 each time the crankshaft rotates once.

Further, these first guide rail 83 and second guide rail 84 are formed so that the interval between them becomes gradually smaller as approaching from the first ends to the other ends. More particularly, the interval between the ends positioned at the exit side when the projecting pin 66 passes through these guide rails 83 and 84, is formed to be smaller than the interval between the ends positioned at the entry side. In the present embodiment, the interval between the guide rails 83 and 84 is formed so as to be substantially equal to the diameter of the projecting pin 66 at the exit side.

In the present embodiment, the guide member 80 is driven to rotate between the first guide position and the second guide position. The first guide position is the position of the guide member 80 when the guide member 80 has rotated the most in the direction from the first guide rail 83 toward the second guide rail 84 within the rotatable range. That is, the first guide position is the position of the guide member 80 when the guide member 80 has rotated the most in the direction toward the crankcase within the rotatable range.

The second guide position is the position of the guide member 80 when the guide member 80 has rotated the most in the direction from the second guide rail 84 toward the first guide rail 83 within the rotatable range. That is, the second guide position is the position of the guide member 80 when the guide member 80 has rotated the most in the direction toward the cylinder head 4 within the rotatable range.

Note that, in the above embodiment, the guide member 80 can rotate about the rotation axis A8. However, the guide member 80 need not be rotatably attached to the engine body, as long as its guide position can be changed. For example, it may also be attached to the engine body to be able to translationally move with respect to the engine body.

(Change of Compression Ratio Along with Operation of Guide Member)

Next, referring to FIGS. 10A to 13C, the change in the effective length of the variable length connecting rod 6 accompanying operation of the guide member 80, that is, the change in compression ratio, will be explained. FIGS. 10A to 10C and FIGS. 11A to 11C are schematic side views showing the change in the variable length connecting rod 6 when switching the guide member 80 to the first guide position. FIGS. 12A to 12C and FIGS. 13A to 13C are schematic side views showing the change in the variable length connecting rod 6 when switching the guide member 80 to the second guide position.

Figure 10C:
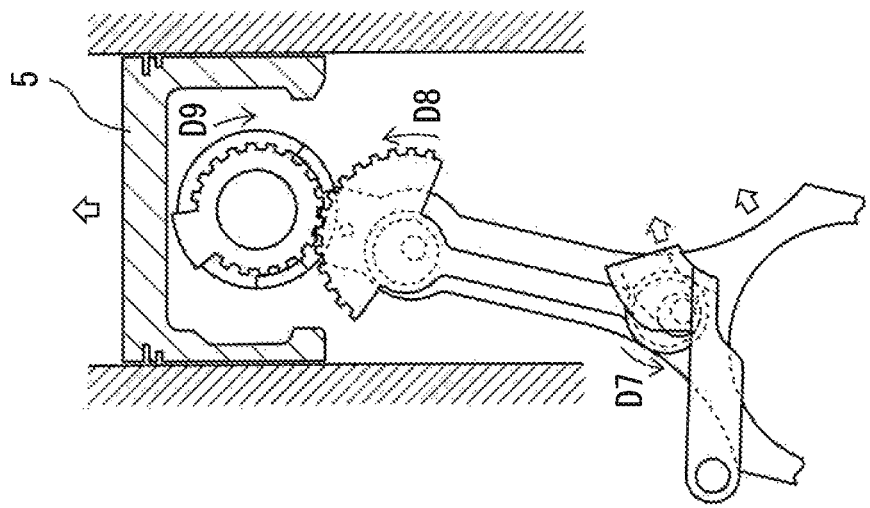
FIGS. 10A to 10C are schematic side views showing states of change in a variable length connecting rod when a position of a guide member is switched to a first guide position.
Figure 10B:
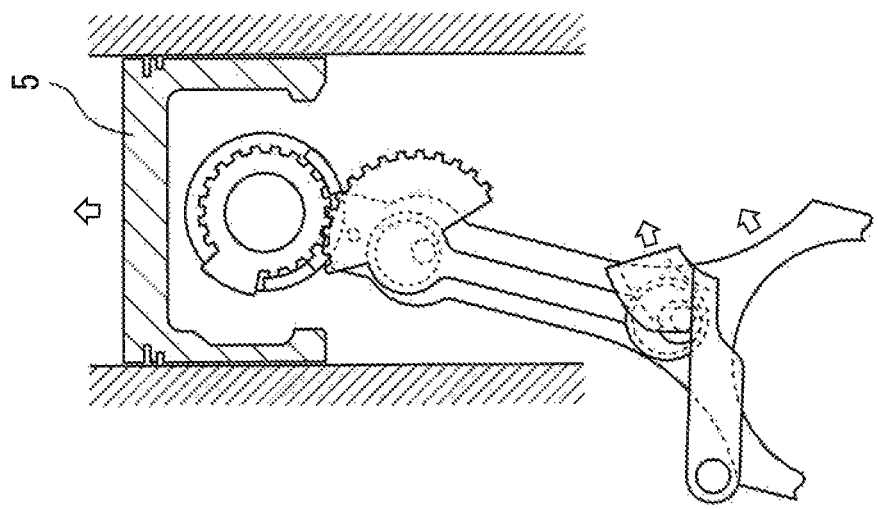
Figure 10A:
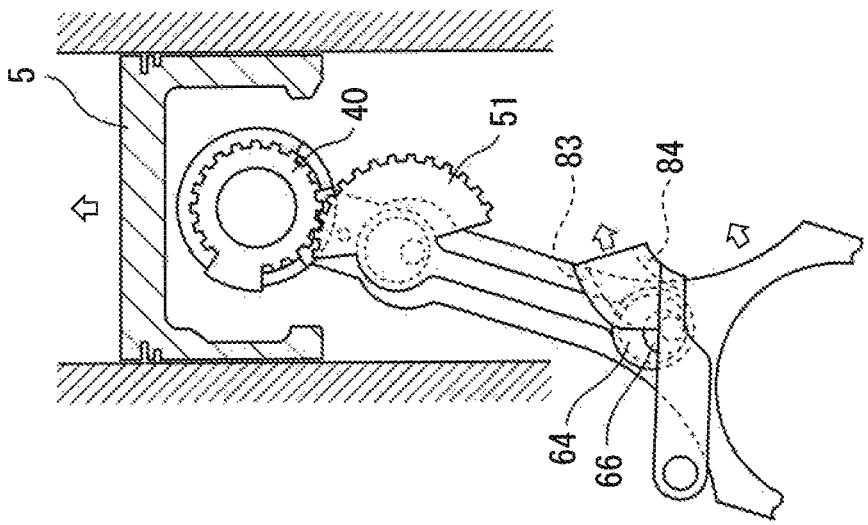

In the state shown in FIG. 10A, the eccentric member 40, similarly to the state shown in FIG. 8B, is positioned at the eccentric member second rotation position. Therefore, the drive gear 51 is positioned at the drive gear second rotation position while the eccentric rotation member 64 is positioned at the rotation member second rotation position. In addition, the projecting pin 66 is positioned at the second relative position with respect to the connecting rod body 30 and accordingly is positioned at the upper side (small end 34 side) in a direction perpendicular to the path of the rotation axis A7 of the projecting pin 66. Further, in this state, the second recess 74 formed in the drive gear 51 is aligned with the lock ball 71 of the lock mechanism 70 and accordingly the drive gear 51 and eccentric member 40 are locked by the lock mechanism.

Further, in the state shown in FIG. 10A, the guide member 80 is switched to the first guide position. Therefore, the guide member 80 is in a state rotated the most in the direction toward the crankcase.

If the crankshaft rotates in this state, the big end 33 of the variable length connecting rod 6 moves in the upper right direction in FIG. 10A along with the rotation of the crank pin 22. Further, along with this, the small end 34 of the variable length connecting rod 6 moves upward and the piston 5 attached to the small end 34 rises. Along with such movement of the variable length connecting rod 6, the projecting pin 66 of the variable length connecting rod 6 also moves in the upper right direction in FIG. 10A.

If the projecting pin 66 moves along with movement of the variable length connecting rod 6, as shown in FIG. 10B, the projecting pin 66 enters the guide passage between the first guide rail 83 and second guide rail 84 of the guide member 80. At this time, as explained above, the guide member 80 is positioned at the first guide position. Therefore, the guide member 80 is in a state rotated the most in the direction toward the crankcase. For this reason, the first guide rail 83 and the second guide rail 84 are both positioned downward. For this reason, the projecting pin 66 positioned at the second relative position (upper side position) contacts the guide surface (lower surface) of the first guide rail 83 positioned in upper side thereof.

The guide surface of the first guide rail 83 is formed so that when the guide member 80 is at the first guide position, it gradually approaches the path P of the rotation axis A7 of the projecting pin 66 in the direction of advance of the projecting pin 66. For this reason, if the variable length connecting rod 6 moves further from the state shown in FIG. 10B, the projecting pin 66 is pushed downward by the first guide rail 83 relative to the connecting rod body 30. Due to this, the projecting pin 66, as shown in FIG. 10C, rotates about the rotation axis A7 in the counterclockwise direction (direction of arrow D7 of FIG. 10C). Along with this, the drive gear 51 rotates in the counterclockwise direction (direction of arrow D8 of FIG. 10C) and the eccentric member 40 rotates in the clockwise direction (direction of arrow D9 of FIG. 10C).

Note that, in the state shown in FIG. 10A, as explained above, the drive gear 51 and eccentric member 40 are locked by the lock mechanism 70. However, if the projecting pin 66 is pushed downward and the drive gear 51 rotates in the counterclockwise direction, the lock ball 71 of the lock mechanism 70 slips out from the second recess 74 and the lock is released.

Figure 11A:
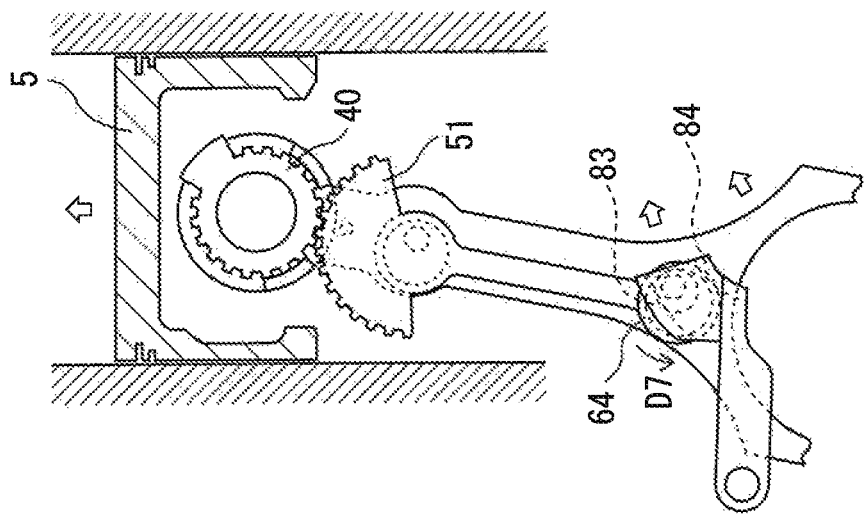
FIGS. 11A to 11C are schematic side views showing states of change in a variable length connecting rod when a position of a guide member is switched to a first guide position.

If the variable length connecting rod 6 further moves from the state shown in FIG. 10C, the guide surface of the first guide rail 83 gradually approaches the path P of the rotation axis A7 of the projecting pin 66, and therefore the projecting pin 66 is pushed further downward by the first guide rail 83 relative to the connecting rod body 30. Due to this, as shown in FIG. 11A, the projecting pin 66 gradually rotates about the rotation axis A7 in the counterclockwise direction (direction of arrow D7 of FIG. 11A), as the projecting pin 66 advances along with movement of the variable length connecting rod 6. Therefore, as the projecting pin 66 advances, the drive gear 51 rotates in the counterclockwise direction and the eccentric member 40 rotates in the clockwise direction.

Figure 11B:
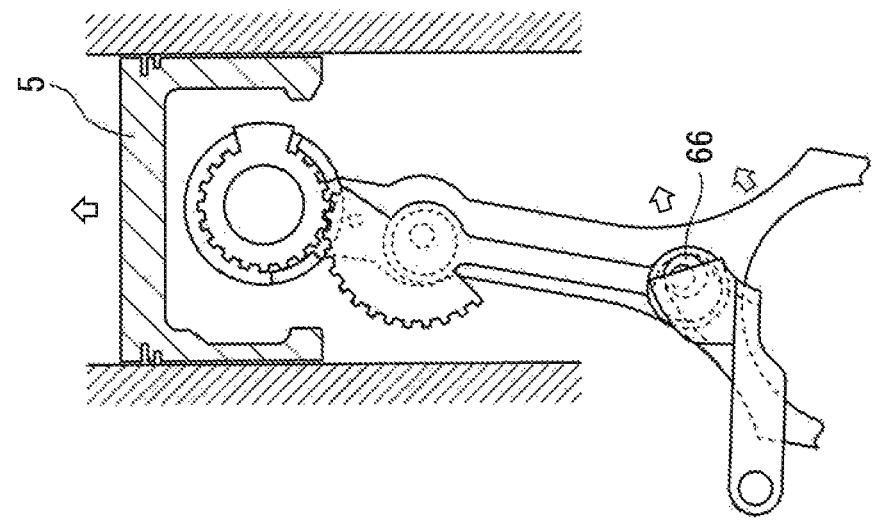

Further, finally, as shown in FIG. 11B, near the exit of the guide passage between the first guide rail 83 and the second guide rail 84, the projecting pin 66 reaches the first relative position. At this time, the eccentric rotation member 64 reaches the rotation member first rotation position and the drive gear 51 reaches the drive gear first rotation position. Accordingly, the eccentric member 40 reaches the eccentric member first rotation position. Therefore, the variable length connecting rod 6 is in the state shown in FIG. 8A. As a result, the effective length of the variable length connecting rod 6 is long and the mechanical compression ratio is high. Further, at this time, the lock ball 71 of the lock mechanism 70 is partially received in the first recess 73 provided at the drive gear 51. Accordingly, the drive gear 51 and eccentric member 40 are locked.

Figure 11C:
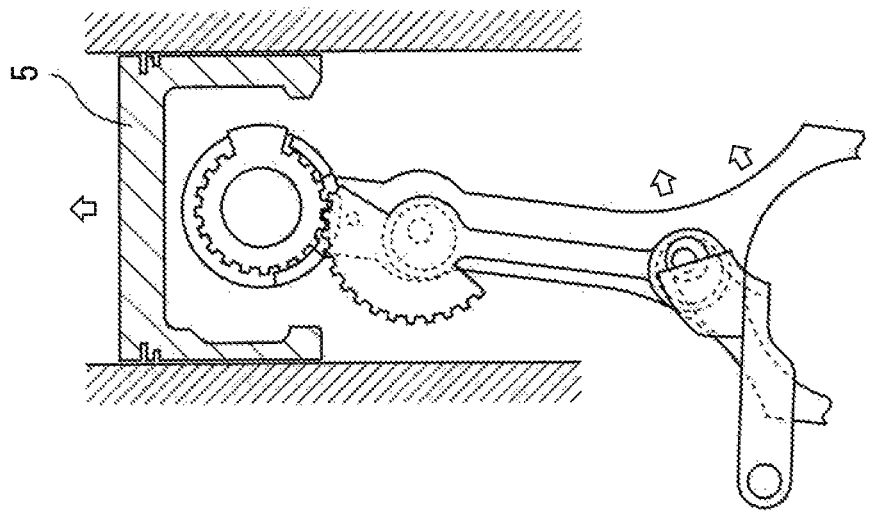

Then, if the variable length connecting rod 6 is moved further from the state shown in FIG. 11B, as shown in FIG. 11C, the projecting pin 66 which had abutted against the first guide rail 83 separates from the first guide rail 83 and slips out from the guide passage between the first guide rail 83 and the second guide rail 84.

In this way, if the guide member 80 is moved to the first guide position, the effective length of the variable length connecting rod 6 can be made longer. Accordingly, the mechanical compression ratio of the internal combustion engine can be made higher.

On the other hand, in the state shown in FIG. 12A, the eccentric member 40, similarly to the state shown in FIG. 8A, is positioned at the eccentric member first rotation position. Therefore, the drive gear 51 is positioned at the drive gear first rotation position, while the eccentric rotation member 64 is positioned at the rotation member first rotation position. In addition, the projecting pin 66 is positioned at the first relative position with respect to the connecting rod body 30 and accordingly is positioned at the lower side (big end 33 side) in a direction perpendicular to the path of the rotation axis A7 of the projecting pin 66. Further, in this state, the first recess 73 formed in the drive gear 51 is aligned with the lock ball 71 of the lock mechanism 70 and accordingly the drive gear 51 and eccentric member 40 are locked by the lock mechanism.

Further, in the state shown in FIG. 12A, the guide member 80 is switched to the second guide position. Therefore, the guide member 80 is in a state rotated the most in the direction toward the cylinder head 4.

If the crankshaft rotates from this state, the big end 33 of the variable length connecting rod 6 moves toward the upper right direction in FIG. 12A along with rotation of the crank pin 22. Further, along with this, the small end 34 of the variable length connecting rod 6 moves upward and the piston 5 attached to the small end 34 rises. The projecting pin 66 of the variable length connecting rod 6 also moves toward the upper right direction in FIG. 12A along with such movement of the variable length connecting rod 6.

If the projecting pin 66 moves along with movement of the variable length connecting rod 6, as shown in FIG. 12B, the projecting pin 66 enters the guide passage between the first guide rail 83 and second guide rail 84 of the guide member 80. At this time, as explained above, the guide member 80 is positioned at the second guide position while the guide member 80 is in a state rotated the most in the direction toward the cylinder head 4. For this reason, the first guide rail 83 and the second guide rail 84 are both positioned upward. For this reason, the projecting pin 66 positioned at the first relative position (lower side position) contacts the guide surface (upper surface) of the second guide rail 84 positioned in lower side thereof.

The guide surface of the second guide rail 84 is formed so that when the guide member 80 is at the second guide position, it gradually approaches the path P of the rotation axis A7 of the projecting pin 66 in the direction of advance of the projecting pin 66. For this reason, if the variable length connecting rod 6 moves further from the state shown in FIG. 12B, the projecting pin 66 is pushed upward by the second guide rail 84 relative to the connecting rod body 30. Due to this, the projecting pin 66, as shown in FIG. 12C, rotates about the rotation axis A7 in the clockwise direction (direction of arrow D10 of FIG. 12C). Along with this, the drive gear 51 rotates in the clockwise direction (direction of arrow D11 of FIG. 12C) and the eccentric member 40 rotates in the counterclockwise direction (direction of arrow D12 of FIG. 12C).

Note that, in the state shown in FIG. 12A, as explained above, the drive gear 51 and eccentric member 40 are locked by the lock mechanism 70. However, if the projecting pin 66 is pushed upward and the drive gear 51 rotates in the clockwise direction, the lock ball 71 of the lock mechanism 70 slips out from the first recess 73 and the lock is released.

If the variable length connecting rod 6 further moves from the state shown in FIG. 12C, the guide surface of the second guide rail 84 gradually approaches the path P of the rotation axis A7 of the projecting pin 66, and therefore the projecting pin 66 is pushed further upward by the second guide rail 84 relative to the connecting rod body 30. Due to this, as shown in FIG. 13A, the projecting pin 66 gradually rotates about the rotation axis A7 in the clockwise direction (direction of arrow D10 of FIG. 13A), as the projecting pin 66 advances along with movement of the variable length connecting rod 6. Therefore, as the projecting pin 66 advances, the drive gear 51 rotates in the clockwise direction and the eccentric member 40 rotates in the counterclockwise direction.

Further, finally, as shown in FIG. 13B, near the exit of the guide passage between the first guide rail 83 and the second guide rail 84, the projecting pin 66 reaches the second relative position. At this time, the eccentric rotation member 64 reaches the rotation member second rotation position and the drive gear 51 reaches the drive gear second rotation position. Accordingly, the eccentric member 40 reaches the eccentric member second rotation position. Therefore, the variable length connecting rod 6 is in the state shown in FIG. 8B. As a result, the effective length of the variable length connecting rod 6 is short and the mechanical compression ratio is low. Further, at this time, the lock ball 71 of the lock mechanism 70 is partially received in the second recess 74 provided at the drive gear 51. Accordingly, the drive gear 51 and eccentric member 40 are locked.

Then, if the variable length connecting rod 6 is moved further from the state shown in FIG. 13B, as shown in FIG. 13C, the projecting pin 66 which had abutted against the second guide rail 84 separates from the second guide rail 84 and slips out from the guide passage between the first guide rail 83 and the second guide rail 84.

If the guide member 80 is moved to the second guide position in this way, the effective length of the variable length connecting rod 6 can be made shorter and therefore the mechanical compression ratio of the internal combustion engine can be made lower.

Due to the above, according to the present embodiment, the guide member 80 is configured to be switched between at least a first guide position and a second guide position. When the guide member 80 is at the first guide position, the projecting pin 66 is guided so that the eccentric member 40 is moved to the eccentric member first rotation position, while when the guide member 80 is at the second guide position, the projecting pin 66 is guided so that the eccentric member 40 is moved to the eccentric member second rotation position.

(Effect in Variable Compression Ratio Mechanism of Present Embodiment)

According to the variable compression ratio mechanism of the present embodiment, the main components provided at the variable length connecting rod 6 for rotating the eccentric member 40 are only the drive gear 51, link member 58, and eccentric rotation member 64. Therefore, the variable length connecting rod 6 can have relatively simple structure. Further, the centers of gravity of the drive gear 51, link member 58, and eccentric rotation member 64 are maintained at positions relatively close to the center axis C of the connecting rod body 30 even if the eccentric member 40 is rotated. For this reason, according to the variable compression ratio mechanism of the present embodiment, the balance of weight of the variable length connecting rod 6 is kept from greatly changing along with the change of the mechanical compression ratio.

Further, according to the variable compression ratio mechanism of the present embodiment, it is possible to reduce the operating noise when switching the mechanical compression ratio. In this regard, when the eccentric member 40 rotates from the eccentric member first rotation position to the eccentric member second rotation position, the eccentric member 40 is stopped in rotation by the projection 45 of the eccentric member 40 abutting against the stop member 38. Therefore, if the projection 45 abuts against the stop member 38 in the state where the eccentric member 40 is rotating at a high speed, a collision noise is caused.

As opposed to this, in the present embodiment, the guide surface of the second guide rail 84 is formed so as to gradually approach the path P of the rotation axis A7 of the projecting pin 66 in the direction of advance of the projecting pin 66 when the guide member 80 is at the second guide position. For this reason, the eccentric member 40 gradually rotates at a low speed, and therefore the projection 45 of the eccentric member 40 can be kept from colliding against the stop member 38 and generating a large collision noise.

In particular, in the present embodiment, the second guide rail 84 may also be configured so that the slant of the guide surface of the second guide rail 84 with respect to the path P of the rotation axis A7 of the projecting pin 66 becomes smaller near the exit, compared with at the center of the guide passage in the direction of advance. Due to this, it is possible to reduce the noise when the projection 45 of the eccentric member 40 abuts against the stop member 38.

In addition, in the present embodiment, the second guide rail 84 may also be configured so that the slant of the guide surface of the second guide rail 84 with respect to the path P of the rotation axis A7 of the projecting pin 66 becomes smaller near the entry, compared with at the center of the guide passage in the direction of advance. Due to this, it is possible to reduce the noise when the projecting pin 66 abuts against the second guide rail 84.

Similarly, when the eccentric member 40 rotates from the eccentric member second rotation position to the eccentric member first rotation position, the eccentric member 40 is stopped in rotation by the projection 45 of the eccentric member 40 abutting against the stop member 39. Therefore, if the projection 45 abuts against the stop member 39 in the state where the eccentric member 40 is rotating at a high speed, a collision noise is caused.

As opposed to this, in the present embodiment, the guide surface of the first guide rail 83 is formed so as to gradually approach the path P of the rotation axis A7 of the projecting pin 66 in the direction of advance of the projecting pin 66 when the guide member 80 is at the first guide position. For this reason, the eccentric member 40 gradually rotates at a low speed, and therefore the projection 45 of the eccentric member 40 can be kept from colliding against the stop member 39 and generating a large collision noise.

In particular, in the present embodiment, the first guide rail 83 may also be configured so that the slant of the guide surface of the first guide rail 83 with respect to the path P of the rotation axis A7 of the projecting pin 66 becomes smaller near the exit, compared with at the center of the guide passage in the direction of advance. Due to this, it is possible to reduce the noise when the projection 45 of the eccentric member 40 abuts against the stop member 39.

In addition, in the present embodiment, the first guide rail 83 may also be configured so that the slant of the guide surface of the first guide rail 83 with respect to the path P of the rotation axis A7 of the projecting pin 66 becomes smaller near the entry, compared with at the center of the guide passage in the direction of advance. Due to this, it is possible to reduce the noise when the projecting pin 66 abuts against the first guide rail 83.

Modifications of First Embodiment

In the above first embodiment, the position of the guide member 80 is switched in two stages between the first guide position and the second guide position. Along with this, the rotation position of the eccentric member 40 is switched in two stages between the eccentric member first rotation position and the eccentric member second rotation position. However, the guide member 80 may be configured so that it is not switched in two stages, but is switched in three stages or more. In this case, the guide member 80 is formed so that the interval between the first guide rail 83 and the second guide rail 84 is substantially equal to the diameter of the projecting pin 66 at the exit of the guide passage of the guide member 80.

If the guide member 80 can be positioned at the intermediate point between the above-mentioned first guide position and second guide position in this way, along with this, it is possible to position the eccentric member 40 at a rotation position between the eccentric member first rotation position and the eccentric member second rotation position. Therefore, it is possible to set the effective length of the variable length connecting rod 6 in multiple stages between the maximum length and minimum length. Accordingly, the mechanical compression ratio can be set in multiple stages between the maximum mechanical compression ratio and minimum mechanical compression ratio.

Note that, if the eccentric member 40 is configured to be positioned in multiple stages between the eccentric member first rotation position and the eccentric member second rotation position in this way, the drive gear 51 is provided with recesses for the lock mechanism 70 corresponding to the positions of the different stages. Therefore, when the eccentric member 40 is designed to be switched in four stages, the drive gear 51 is provided with four recesses.

Second Embodiment

Next, referring to FIGS. 14A and 14B, the variable compression ratio mechanism according to a second embodiment will be explained. The configuration and operation of the variable compression ratio mechanism according to the present embodiment are basically similar to the configuration and operation of the variable compression ratio mechanism according to the first embodiment. Therefore, below, points different from the variable compression ratio mechanism according to the first embodiment will be focused on in the explanation.

FIGS. 14A and 14B are side views, similar to FIGS. 8A and 8B, schematically showing the variable length connecting rod 6. FIG. 14A shows the state where the effective length of the variable length connecting rod 6 is long and thus the mechanical compression ratio is high, while FIG. 14B shows the state where the effective length of the variable length connecting rod 6 is short and thus the mechanical compression ratio is low.

In the state shown in FIG. 14A, in the same way as the state shown in FIG. 8A, the eccentric rotation member 64 is at the rotation member first rotation position where it is rotated the most in the counterclockwise direction (direction of arrow D1 in figure) within the rotatable range. At this time, as will be understood from FIG. 14A, the projecting pin 66 is positioned around the rotation axis A7 relatively downward (first relative position). Further, the drive gear 51 is positioned at the drive gear first rotation position where it is rotated about the rotation axis A3 the most in the counterclockwise direction within the rotatable range (direction of arrow D2 in figure).

At this time, the eccentric member 40 is positioned at the eccentric member first rotation position where it is rotated about the rotation axis A1 the most in the clockwise direction (direction of arrow D3 in figure) within the rotatable range. In this regard, in the variable compression ratio mechanism of the present embodiment, when the eccentric member 40 is at the eccentric member first rotation position, the axis A2 of the piston pin receiving opening 44 is positioned further away from the axis of the crank receiving opening 31 than the axis A1 of the eccentric member 40, and is positioned rotated slightly more in the clockwise direction (by angle α of FIG. 14A) than on the center axis C of the connecting rod body 30.

In addition, in the present embodiment, when the eccentric member 40 is at the above-mentioned eccentric member first rotation position, the projection 45 of the eccentric member 40 abuts against the stop member 39. Therefore, in the present embodiment, the stop member 39 is arranged so that when the eccentric member 40 is at the eccentric member first rotation position, it abuts against the projection 45 so that the eccentric member 40 does not rotate more in the clockwise direction (one rotation direction) from the state shown in FIG. 14A.

According to the present embodiment, by setting the eccentric member first rotation position in this way, if the combustion load accompanying combustion of fuel at the combustion chamber 7 is transmitted through the piston 5 to the eccentric member 40 when the eccentric member 40 is at the first rotation position, the eccentric member 40 receives force in the clockwise direction in FIG. 14A (direction of arrow D1 in figure). However, even if the eccentric member 40 receives such a load, the projection 45 abuts against the stop member 39, and therefore the eccentric member 40 does not rotate. For this reason, even if the eccentric member 40 receives a large force from the piston 5, the eccentric member 40 is kept from rotating.

In the state shown in FIG. 14B, in the same way as the state shown in FIG. 8B, the eccentric rotation member 64 is at the rotation member second rotation position where it is rotated the most in the clockwise direction (direction of arrow D4 in figure) within the rotatable range. At this time, as will be understood from FIG. 14B, the projecting pin 66 is positioned about the rotation axis A7 relative upward (second relative position). Further, the drive gear 51 is at the drive gear second rotation position where it is rotated about the rotation axis A3 the most in the clockwise direction (direction of arrow D5 in figure) within the rotatable range.

At this time, the eccentric member 40 is at the eccentric member second rotation position where it is rotated about the rotation axis A1 the most in the counterclockwise direction (direction of arrow D6 in figure) within the rotatable range. In this regard, in the variable compression ratio mechanism of the present embodiment, when the eccentric member 40 is at the eccentric member second rotation position, the axis A2 of the piston pin receiving opening 44 is positioned closer to the axis of the crank receiving opening 31 than the rotation axis A1 of the eccentric member 40, and is positioned rotated slightly more in the counterclockwise direction (by angle α in FIG. 14B) than the center axis C of the connecting rod body 30.

In addition, in the present embodiment, when the eccentric member 40 is at the above-mentioned eccentric member second rotation position, the projection 45 of the eccentric member 40 abuts against the stop member 38. Therefore, in the present embodiment, the stop member 38 is arranged so that when the eccentric member 40 is at the eccentric member second rotation position, it abuts against the projection 45 so that the eccentric member 40 does not rotate further in the counterclockwise direction in FIG. 14B (direction opposite to above one rotation direction).

According to the present embodiment, by setting the eccentric member second rotation position in this way, when the eccentric member 40 is in the second rotation position, if the inertia load accompanying reciprocating motion of the piston 5 is transmitted through the piston 5 to the eccentric member 40, the eccentric member 40 receives force in the counterclockwise direction (direction of arrow D1 in figure) in FIG. 14B. However, even if the eccentric member 40 receives this load, the projection 45 abuts against the stop member 38 whereby the eccentric member 40 does not rotate. For this reason, even if the eccentric member 40 receives a large force from the piston 5, the eccentric member 40 is kept from rotating.

Note that, the above angle α is an angle corresponding to the variation in angle occurring due to machining tolerances and assembly tolerances.

Specifically, the angle α is less than several degrees.

REFERENCE SIGNS LIST 1. internal combustion engine
5. piston
6. variable length connecting rod
30. connecting rod body
38. stop member
39. stop member
40. eccentric member
44. piston pin receiving opening
45. projection
50. eccentric member drive mechanism
51. drive gear
58. link member
64. eccentric rotation member
66. projecting pin
70. lock mechanism
71. lock ball
80. guide member

The invention claimed is:

1. A variable compression ratio mechanism comprising a variable length connecting rod which can change an effective length between an axis of a piston pin receiving opening for receiving a piston pin and an axis of a crank receiving opening for receiving a crank pin,
   wherein the variable length connecting rod comprises:
      a connecting rod body provided with the crank receiving opening;
      an eccentric member provided with the piston pin receiving opening, provided at the connecting rod body rotatably to the connecting rod body, and configured so that the effective length changes if the eccentric member is rotated; and
      an eccentric member drive mechanism provided with a projecting pin projecting out from the connecting rod body with an angle with respect to a movement plane of the variable length connecting rod and configured to make the eccentric member rotate if a relative position of the projecting pin with respect to the connecting rod body changes,
   wherein the variable compression ratio mechanism further comprises a guide member attached to an engine body so as not to move together with the variable length connecting rod and guiding the projecting pin during operation of an internal combustion engine,
   wherein the guide member guides the projecting pin so that a relative position of the projecting pin changes if a guide position is changed, wherein the eccentric member is configured so that an axis of the piston pin receiving opening is offset from a rotation axis of the eccentric member, wherein the eccentric member drive mechanism is configured so that a rotation position of the eccentric member is a first rotation position when the projecting pin is at a first relative position with respect to the connecting rod body, and so that the rotation position of the eccentric member is a second rotation position where the effective length is shorter than the first rotation position when the projecting pin is at a second relative position with respect to the connecting rod body, wherein the guide member is configured to be switched between at least a first guide position and a second guide position to guide the projecting pin to the first relative position when the guide member is at the first guide position, and to guide the projecting pin to the second relative position when the guide member is at the second guide position, and wherein the guide member comprises a first guide rail and a second guide rail arranged facing each other, and is configured so that when the guide member is at the first guide position, the projecting pin is guided by the first guide rail to a first relative position and when the guide member is at the second guide position, the projecting pin is guided by the second guide rail to a second relative position.

2. The variable compression ratio mechanism according to claim 1, wherein the first rotation position is a rotation position where an axis of the piston pin receiving opening is on an axis of the connecting rod body and positioned further away from an axis of the crank receiving opening than a rotation axis of the eccentric member, and the second rotation position is a rotation position where an axis of the piston pin receiving opening is on an axis of the connecting rod body and positioned closer to an axis of the crank receiving opening than a rotation axis of the eccentric member.

3. The variable compression ratio mechanism according to claim 1, wherein the variable length connecting rod further comprises a lock mechanism for locking the eccentric member so that it does not rotate when the eccentric member is at the first rotation position and the second rotation position.

4. The variable compression ratio mechanism according to claim 1, wherein the guide member is configured so that the projecting pin moves through a guide passage between the first guide rail and the second guide rail during operation of the internal combustion engine, and the first guide rail and the second guide rail are formed so that a guide passage exit side in a direction of advance of the projecting pin becomes narrower in interval between the two than a guide passage entry side.

5. The variable compression ration mechanism according to claim 1, wherein the guide member is rotatably attached to the engine body, and is configured so as to be able to move between the first guide position and the second guide position by rotating the guide member with respect to the engine body.

6. The variable compression ratio mechanism according to claim 1, wherein the eccentric member further comprises a projection projecting out from an outer surface outward in a radial direction and the connecting rod body further comprises a stop member arranged around the eccentric member, and the stop member is arranged so that the projection abuts against the stop member when the eccentric member is at the first rotation position and second rotation position.

7. The variable compression ratio mechanism according to claim 6, wherein the eccentric member is configured so that an axis of the piston pin receiving opening is offset from a rotation axis of the eccentric member, the first rotation position is a rotation position where the axis of the piston pin receiving opening rotates further in one rotation direction than on the axis of the connecting rod body and a position where it is positioned further from the axis of the crank receiving opening than the rotation axis of the eccentric member, and the stop member is arranged so that when the eccentric member is at the first rotation position, the projection abuts against the stop member so that the eccentric member does not rotate more in that one rotation direction.

8. The variable compression ratio mechanism according to claim 7, wherein the second rotation position is a rotation position where the axis of the piston pin receiving opening rotates more in the opposite direction from the one rotation direction than on the axis of the connecting rod body, and a position where it is positioned closer to the axis of the crank receiving opening than the rotation axis of the eccentric member, and the stop member is arranged so that when the eccentric member is at the second rotation position, the projection abuts against the stop member so that the eccentric member does not rotate more in the direction opposite to that one rotation direction.

9. A variable compression ratio mechanism comprising a variable length connecting rod which can change an effective length between an axis of a piston pin receiving opening for receiving a piston pin and an axis of a crank receiving opening for receiving a crank pin, wherein the variable length connecting rod comprises:

a connecting rod body provided with the crank receiving opening;

an eccentric member provided with the piston pin receiving opening, provided at the connecting rod body rotatably to the connecting rod body, and configured so that the effective length changes if the eccentric member is rotated; and an eccentric member drive mechanism provided with a projecting pin projecting out from the connecting rod body with an angle with respect to a movement plane of the variable length connecting rod and configured to make the eccentric member rotate if a relative position of the projecting pin with respect to the connecting rod body changes, wherein the variable compression ratio mechanism further comprises a guide member attached to an engine body so as not to move together with the variable length connecting rod and guiding the projecting pin during operation of an internal combustion engine, wherein the guide member guides the projecting pin so that a relative position of the projecting pin changes if a guide position is changed, wherein the eccentric member has a gear part formed with a gear at its outer circumference, wherein the eccentric member drive mechanism comprises a drive gear rotatably attached to the connecting rod body and meshing with the gear part of the eccentric member; and a link mechanism provided with the projecting pin and coupled with the drive gear, wherein the link mechanism is configured so that when a relative position of the projecting pin changes, the rotation position of the drive gear is changed through the link mechanism, wherein the drive gear comprises a first circular part having an axis offset from the rotation axis of the drive gear and the link mechanism comprises at one end part a link member provided with a first ring part fitting with the first circular part, wherein the link mechanism further comprises an eccentric rotation member rotatably attached to the connecting rod body and having the projecting pin fixed to it, wherein the eccentric rotation member comprises a second circular part having an axis offset from the rotation axis of eccentric rotation member, and the projecting pin is fixed to the eccentric rotation member so that its axis is offset from the rotation axis of the eccentric rotation member, and wherein the link member comprises a second ring part fitting with the second circular part at the end at the opposite side to the end where the first ring part is provided.

10. The variable compression ratio mechanism according to claim 9, wherein the variable length connecting rod further comprises a lock mechanism locking the eccentric member so as not to rotate when the eccentric member is in a predetermined rotation position, the drive gear comprises a recess on a side surface facing the connecting rod body, and the lock mechanism comprises a lock ball and a spring biasing the lock ball, and locks the eccentric member so as not to rotate by making the lock ball partially fit into the recess formed in the drive gear.

* * * * *